(12) United States Patent
Murakami et al.

(10) Patent No.: US 7,584,189 B2
(45) Date of Patent: Sep. 1, 2009

(54) SENTENCE CLASSIFICATION DEVICE AND METHOD

(75) Inventors: Eiji Murakami, Tokyo (JP); Motomi Kohata, Tokyo (JP); Takao Terano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 242 days.

(21) Appl. No.: 11/448,533

(22) Filed: Jun. 6, 2006

(65) Prior Publication Data

US 2006/0288029 A1 Dec. 21, 2006

(30) Foreign Application Priority Data

Jun. 21, 2005 (JP) ............................. 2005-180362

(51) Int. Cl.
*G06F 7/00* (2006.01)

(52) U.S. Cl. ......................................................... 707/7
(58) Field of Classification Search ....................... 707/7
See application file for complete search history.

(56) References Cited

U.S. PATENT DOCUMENTS

| | | | | |
|---|---|---|---|---|
| 6,067,259 A | * | 5/2000 | Handa et al. | 365/200 |
| 2004/0098245 A1 | * | 5/2004 | Walker et al. | 704/1 |
| 2004/0111266 A1 | * | 6/2004 | Coorman et al. | 704/260 |
| 2005/0108001 A1 | * | 5/2005 | Aarskog | 704/10 |

FOREIGN PATENT DOCUMENTS

JP 2003-345811 A 12/2003

OTHER PUBLICATIONS

Nagata, "Text Classification—Learning Theory Sample Fair", Johoshori, vol. 42, first issue, Jan. 2001.
Ohsawa et al., "KeyGraph: Automatic Indexing by Segmenting and Unifing Co-occurrence Graphs", The Transactions of the Institute of Electronics, Information and Communication Engineers, vol. J82-D1, No. 2, pp. 391-400, 1999.
Hara et al., "Keyword Extraction Using Word Co-occurrences and Partial Word Matching", IPSJSIG Technical Report, NL106, p. 16, 1995.
"Information Search Algorithm", 2002, Kyoritsu Publishing Co.
Murakami et al., "The new approach to find the manufacturing and design issure from recall report and application for the knowledge management using text mining", The proceeding of Annual Conference of Japan Society for management Information 2005 Spring, F4-1, pp. 246-249.

* cited by examiner

*Primary Examiner*—Charles Rones
*Assistant Examiner*—Fazlul Quader
(74) *Attorney, Agent, or Firm*—Blakely, Sokoloff, Taylor & Zafman LLP

(57) ABSTRACT

A sentence classification device includes a storage unit, arithmetic processing unit, and screen display unit. The storage unit stores a document set of a plurality of documents and a term list including a plurality of terms each having one or more words. The arithmetic processing unit classifies the respective documents stored in the storage unit on the basis of the term list. The screen display unit displays a processing result obtained by the arithmetic processing unit on a screen.

9 Claims, 20 Drawing Sheets

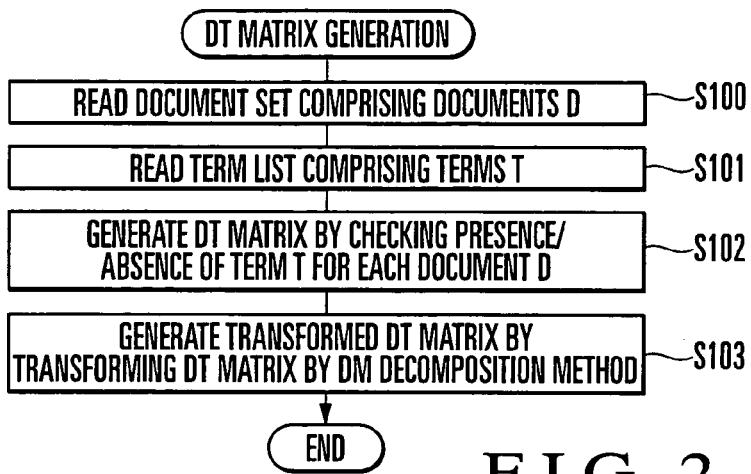

FIG. 2

DOCUMENT SET

| Di | ANSWERER | DOCUMENT CONTENTS |
|---|---|---|
| 1 | W0039411 | KARAOKE IS ALSO FUN, ISN'T IT ? I CAN SING IN RHYTHM AND AM NEVER STOPPED FORM SINGING EVEN IF I MAKE A MISTAKE. WHEN I SING, PEOPLE AROUND ME MAKE SEVERE JUDGMENT, SO I NEED TO PUSH MYSELF INTO ... |
| 351 | M0014787 | IS IT ESCAPE FROM REALITY ? THAT MAY BE SO, BUT I DO NOTHING BUT SLEEP WHEN I FEEL STRESSED. A GOOD DREAM MAKES ME FEEL FINE ... |
| 289 | M0010523 | TAKING A BATH WITH BATH AGENT HAVING FAVORITE SCENT MAKES ME FEEL RELAXED. READING A BOOK WHILE TAKING A BATH RELIEVES STRESS, SO I TAKE A BOOK INTO ... |
| 319 | W0013732 | GETTING A MASSAGE MAKES ME FEEL HAPPY. HOWEVER, GETTING A MASSAGE FROM SOMEONE WHO DOES NOT KNOW CORRECT PRESSURE POINTS MAKES ME FEEL STRESSED. THAT IS, YOU NEED TO GET A MASSAGE FROM YOUR FAVOURITE ... |
| 57 | W0039210 | WELL, THAT IS GOOD. IT SOUNDS COMFORTABLE ! SWINGING AND MISSING ALL THE TIME LIKE ME, HOWEVER, MAY MAKE YOU RATHER FEEL STRESSED, ... SUCH STRESS IS ... |
| 72 | W0039200 | I ALSO FREQUENT THE POOL. HOWEVER, WHEN I PUSH MYSELF TOO HARD, I WILL GET TIRED. SO I CASUALLY SWIM AND WALK FOR ABOUT 30 MINUTES ... |
| 111 | W0012712 | I TOOK A TRIP THE OTHER DAY FOR THE FIRST TIME IN YEARS, ALTHOUGH IT IS JUST AN OVERNIGHT TRIP. HAVING NO NEED TO PREPARE FOR MEALS AND MAKE BEDS MAKES ME SO HAPPY ... |
| 337 | W0013147 | AFTER ALL, GARDENING IS MY WAY OF STRESS RELIEVE. ALTHOUGH MY HUSBAND AND CHILDREN COMPLAIN ALL THE TIME, FLOWERS BLOOM WITHOUT ANY COMPLAINT ... |
| 360 | W0015958 | I HAVE A THREE-YEAR-OLD SON. WE OFTEN GO TO A PARK. ALTHOUGH A GROWN-UP FEELS TOO SHY TO RIDE ON A SWING, YOU CAN... WITH YOUR CHILD. |
| 32 | W0016759 | I AM ALSO A BAD MARRIED WOMAN. I CANNOT SAY WITH CONFIDENCE THAT I PERFECTLY MANAGE HOUSEHOLD CHORES. I GO OUT AT NIGHT ONCE PER TWO OR THREE MONTHS. AT ABOUT 7 O'CLOCK ... |

FIG. 3

TERM LIST

| Tj | KEYWORD FRONT | | KEYWORD BACK | | IMPORTANCE |
|---|---|---|---|---|---|
| 1 | STRESS | NOUN - GENERAL | RELIEF | NOUN - GENERAL | 256 |
| 2 | RELIEF | NOUN - GENERAL | STRESS | NOUN - GENERAL | 256 |
| 3 | STRESS | NOUN - GENERAL | WORK | NOUN - GENERAL | 117 |
| 4 | WORK | NOUN - GENERAL | STRESS | NOUN - GENERAL | 117 |
| 5 | TIME | NOUN - UNINDEPENDENCE - ADVERB | STRESS | NOUN - GENERAL | 116 |
| 6 | SMOKE | VERB - INDEPENDENCE | STRESS | NOUN - GENERAL | 99 |
| 7 | -TIC | NOUN - SUFFIX - ADJECTIVE VERB STEM | STRESS | NOUN - GENERAL | 88 |
| 8 | GO | VERB - INDEPENDENCE | STRESS | NOUN - GENERAL | 86 |
| 9 | NIGHTCAP | NOUN - GENERAL | EVENING DRINK | NOUN - GENERAL | 85 |
| 10 | EVENING DRINK | NOUN - GENERAL | NIGHTCAP | NOUN - GENERAL | 85 |
| 11 | MAN | NOUN - SUFFIX - COUNTER | STRESS | NOUN - GENERAL | 83 |
| 12 | CHILD | NOUN - GENERAL | STRESS | NOUN - GENERAL | 77 |

DT MATRIX

| | | DOCUMENT D | | | | | | | |
|---|---|---|---|---|---|---|---|---|---|
| | | D1 | D2 | D3 | D4 | D5 | D6 | ........... | |
| TERM T | T1 | 0 | 1 | 0 | 0 | 0 | 0 | | 0 |
| | T2 | 0 | 1 | 0 | 1 | 0 | 0 | | 0 |
| | T3 | 0 | 0 | 0 | 0 | 0 | 1 | | 0 |
| | T4 | 1 | 0 | 0 | 0 | 0 | 0 | ........... | 0 |
| | T5 | 0 | 0 | 0 | 0 | 0 | 0 | | 1 |
| | T6 | 0 | 0 | 0 | 0 | 1 | 0 | | 1 |
| | T7 | 1 | 0 | 0 | 0 | 0 | 0 | | 0 |
| | T8 | 0 | 0 | 0 | 0 | 0 | 0 | | 0 |
| | ⋮ | ⋮ | ⋮ | ⋮ | ⋮ | ⋮ | ⋮ | | ⋮ |
| | Tn | 0 | 0 | 0 | 1 | 0 | 0 | ........... | 0 |

—23

0 = NO TERM Tj EXISTS IN DOCUMENT Di
1 = TERM Tj EXISTS IN DOCUMENT Di

FIG. 5

MAXIMUM MATCHING M
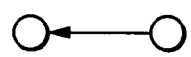
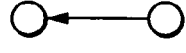
FIG.7D
TARGET G
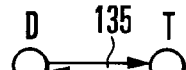
FIG.7E
TARGET G
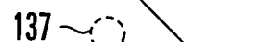
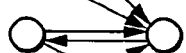
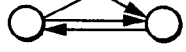
FIG.7F
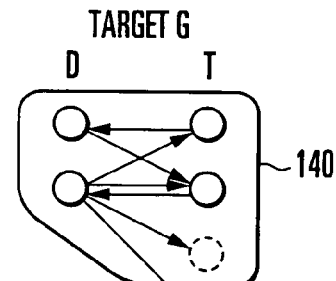
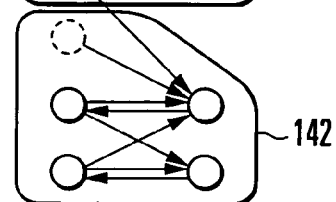

DT MATRIX (INITIAL STATE)

DT MATRIX (FINAL STEP)

ANALYSIS RESULT DISPLAY EXAMPLE

LARGE CLASSIFICATION DATA 25

| CLUSTER ID | LEVEL | VIRTUAL REPRESENTATIVE DOCUMENT ID | ELEMENT DOCUMENT ID | LABEL |
|---|---|---|---|---|
| 1 | 0 | 101 | 001,003 | SOURCE/PATENT |
| 2 | 0 | 119 | 019,024 | SOURCE/LIGHT EMISSION |
| 3 | 0 | 109 | 009,005 | NANO/FORMATION |
| 4 | 0 | 112 | 012,053 | SUBSTRATE/SILICON |
| 5 | 0 | 116 | 016,032 | NANO/PARTICLE |
| 6 | 0 | 111 | 011,044 | SUBSTRATE/FORMATION |
| 7 | 1 | 201 | 101,002 | SOURCE/PATENT |
| 8 | 1 | 216 | 116,109 | SUBSTRATE/SILICIDE |
| 9 | 1 | 212 | 112,147 | LIGHT EMISSION/SILICIDE |
| 10 | 2 | 316 | 216,212 | LIGHT EMISSION/SUBSTRATE |

FIG.16

SYMBOL DATA 26

| SYMBOL ID | SYMBOL TYPE | CLUSTER ID |
|---|---|---|
| C1 | CLUSTER | 1 |
| C2 | CLUSTER | 2 |
| C3 | CLUSTER | 3 |
| ⋮ | ⋮ | ⋮ |
| L1 | LINK | 1,7 |
| L2 | LINK | 3,8 |
| L3 | LINK | 5,8 |
| ⋮ | ⋮ | ⋮ |

FIG.17

SENTENCE CLASSIFICATION DEVICE AND METHOD

BACKGROUND OF THE INVENTION

The present invention relates to a sentence classification device and method and, more particularly, to a sentence classification device and method which classify documents in accordance with the contents of the respective documents and visualize/output the classification result.

In the highly information-oriented society, with advances in information processing and communication technologies, there is being provided an environment in which an enormous amount of computerized information can be easily acquired. The information acquired by using such an environment is also enormous in data amount, and hence desired information needs to be efficiently and accurately comprehended.

As a technique of analyzing the contents of information, a technique of classifying documents constituting each piece of information in accordance with the contents of the documents has been studied.

As a technique of classifying documents, there has been proposed a technique of preparing labels indicating the contents of classifications in advance, analyzing the contents of the respective documents according to a predetermined algorithm, and classifying the respective documents for each prepared label (for example, Masaaki Nagata, "Text Classification—Learning Theory Sample Fair", Johoshori, Volume 42, first issue, January 2001).

According to such a technique, when documents are to be classified, labels indicating the contents of classifications are prepared, and the labels are accurately assigned to the respective documents by using various kinds of learning algorithms, thereby classifying the respective documents for each label.

According to such a sentence classification technique, in order to automatically display the result of classifying the respective documents on a screen, a technique of structurally visualizing the relationship between the respective documents is required. Conventionally, as a conventional technique of visualizing document classification results, there has been provided a technique of obtaining the degrees of relevance between elements as a plurality of documents of two document sets, and displaying the degree of relevance between two elements at the intersection of arbitrary elements (see, for example, Japanese Patent Laid-Open No. 2003-345811). In addition, there has been proposed a technique of visualizing keywords extracted on the basis of the co-occurrence of words (see, for example, Yukio Ohsawa et al., "KeyGraph: Automatic Indexing by Segmenting and Unifing Co-occurrence Graphs", THE TRANSACTIONS OF THE INSTITUTE OF ELECTRONICS, INFORMATION AND COMMUNICATION ENGINEERS, Vol. J82-D1, No. 2, pp. 391-400, 1999, and Masami Hara et al., "Keyword Extraction Using Word Co-occurrences and Partial Word Matching", IPSJSIG Technical Report, NL106, p. 16, 1995).

According to this conventional technique, however, since the relationship between words contained in documents are analyzed and visualized as a network (graph), the importance of each of a plurality of sentences contained in documents or the relationship between sentences cannot be automatically visualized.

SUMMARY OF THE INVENTION

The present invention has been made to solve such problems, and has as its object to provide a sentence classification device and method which can automatically visualize the importance of each document and the relationship between documents.

In order to achieve the above object, according to the present invention, there is provided a sentence classification device comprising a storage unit which stores various kinds of processing information including a document set of a plurality of documents and a term list including a plurality of terms each having not less than one word, an arithmetic processing unit which classifies the respective documents stored in the storage unit on the basis of the term list, and a screen display unit which displays a processing result obtained by the arithmetic processing unit on a screen, the arithmetic processing unit comprising a DT matrix generation unit which generates a DT matrix in which a relationship between each document stored in the storage unit and each term is two-dimensionally expressed, a DT matrix transformation unit which generates a transformed DT matrix in which documents are divided into blocks for each cluster by transforming the DT matrix on the basis of a DM decomposition method used in a graph theory, a virtual representative generation unit which generates a virtual representative document which virtually represents each cluster on the transformed DT matrix from terms of documents belonging to each cluster, a large classification generation unit which generates large classifications of documents by repeating clustering processing as a step by using the DT matrix generated by the DT matrix generation unit in an initial state, the clustering processing comprising a process of causing the DT matrix transformation unit to generate a transformed DT matrix from the DT matrix, a process of causing the virtual representative generation unit to generate a virtual representative document for each cluster on the generated transformed DT matrix, a process of generating a new DT matrix used in next clustering processing by adding the generated virtual representative documents to the transformed DT matrix and deleting documents belonging to the clusters corresponding to the virtual representative documents from the transformed DT matrix, and a process of storing at least information associated with documents constituting each cluster as large classification data in the storage unit for each cluster, and a display processing unit which causes the screen display unit to display, on a screen, large classifications of documents in a tree structure using cluster symbols representing clusters generated in clustering processing and link symbols indicating integral relations between the clusters on the basis of the large classification data stored in the storage unit.

In order to achieve the above object, according to the present invention, there is also provided a sentence classification method comprising the steps of generating a DT matrix in which a relationship between each document and each term is two-dimensionally expressed by referring to a storage unit which stores various kinds of processing information including a document set of a plurality of documents and a term list including a plurality of terms each having not less than one word, generating a transformed DT matrix in which documents are divided into blocks for each cluster by transforming the DT matrix on the basis of a DM decomposition method used in a graph theory, generating a virtual representative document which virtually represents each cluster on the generated transformed DT matrix from terms of documents belonging to each cluster, generating a new DT matrix by adding the generated virtual representative documents to the transformed DT matrix and deleting documents belonging to the clusters corresponding to the virtual representative documents from the transformed DT matrix, storing at least information associated with documents constituting each cluster as large classification data in the storage unit for each cluster, generating large classifications of documents by repeatedly performing clustering processing comprising the steps of generating a transformed DT matrix by using a new DT matrix, further generating a new DT matrix by generating virtual representative documents, and storing information, and displaying, on a screen, large classifications of documents in a tree structure using cluster symbols representing clusters generated in clustering processing and link symbols indicating integral relations between the clusters on the basis of the large classification data stored in the storage unit.

BRIEF DESCRIPTION OF THE DRAWINGS

FIG. 2 is a flowchart showing DT matrix generation processing by the sentence classification device according to this embodiment;

FIG. 3 is a view showing an example of the arrangement of a document set;

FIG. 4 is a view showing an example of the arrangement of a term list;

FIG. 5 is a view showing an example of the arrangement of a DT matrix;

FIGS. 7A to 7F are bipartite graphs each showing a process of DM decomposition;

FIG. 16 is a view showing an example of the arrangement of large classification data;

FIG. 17 is a view showing an example of the arrangement of symbol data;

DESCRIPTION OF THE PREFERRED EMBODIMENTS

The embodiments of the present invention will be described next with reference to the accompanying drawings.

First Embodiment

Figure 1:
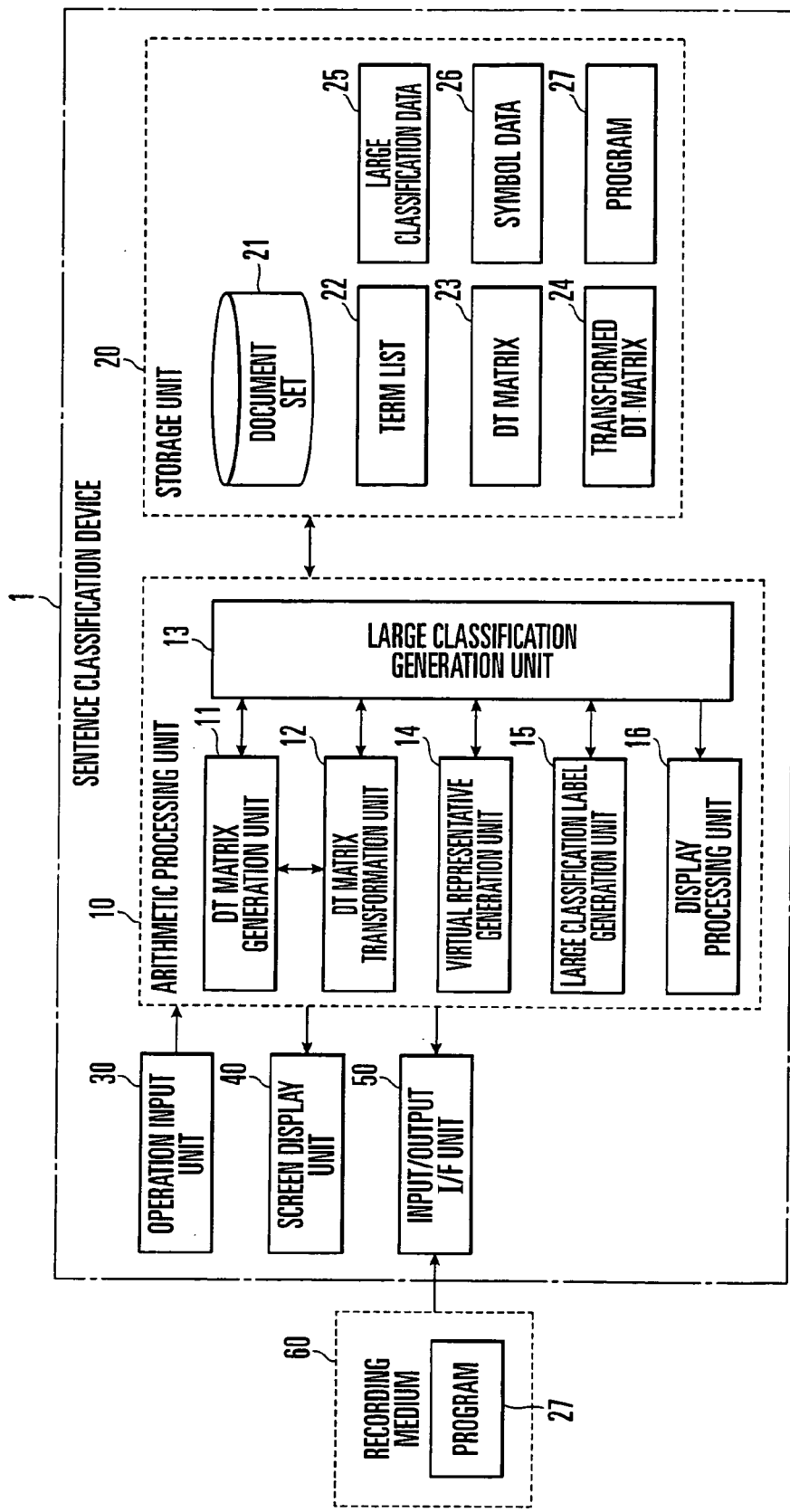
FIG. 1 is a block diagram showing the arrangement of a sentence classification device according to the first embodiment of the present invention.

A sentence classification device according to the first embodiment of the present invention will be described first with reference to FIG. 1. FIG. 1 shows the arrangement of the sentence classification device according to the first embodiment of the present invention.

A sentence classification device 1 is comprised of a computer as a whole and is provided with an arithmetic processing unit 10, storage unit 20, operation input unit 30, screen display unit 40, and input/output interface unit (to be referred to as input/output I/F unit hereinafter) 50.

The arithmetic processing unit 10 is comprised of a microprocessor such as a CPU and its peripheral circuits. The arithmetic processing unit 10 executes a program 27 stored in the storage unit 20 in advance so as to operate the above hardware in cooperation with the program, thereby implementing various types of functional units for document classification processing.

The storage unit 20 is comprised of a storage device such as a hard disk or a memory, and stores various kinds of processing information used in the processing by the arithmetic processing unit 10. The main processing information stored includes a document set 21 of a plurality of documents as classification targets, a term list 22 having a plurality of terms each having not less than one important word for grasping the contents of each document, a DT matrix 23 indicating a relationship between each document and each term, a transformed DT matrix 24 obtained by transforming the DT matrix 23, large classification data 25 indicating the result of large classification of documents, and the program 27 read and executed by the arithmetic processing unit 10.

The operation input unit 30 is comprised of operation input devices such as a keyboard and a mouse. The operation input unit 30 detects operation by an operator and outputs the resultant information to the arithmetic processing unit 10.

The screen display unit 40 is comprised of a screen display device such as an LCD and a PDP, and displays/outputs the processing contents in the arithmetic processing unit 10 and processing results.

The input/output I/F unit 50 is a circuit unit for connection to an external device and a communication network, and is used to exchange obtained processing results and the program 27 with an external device and a recording medium 60 in addition to the document set 21, term list 22, and large classification data 25. FIG. 1 shows a state wherein the recording medium 60 on which the program 27 is recorded is connected to the input/output I/F unit 50.

The arithmetic processing unit 10 is provided with, as functional units, a DT matrix generation unit 11, DT matrix transformation unit 12, large classification generation unit 13, virtual representative generation unit 14, large classification label generation unit 15, and display processing unit 16.

In this embodiment, a DT (Document-Term) matrix is a matrix which two-dimensionally expresses the relationship between each document D (Document) and each term T (Term). The above relationship is based on the presence/absence of the term T in the document D. More specifically, the documents D and terms T are made to correspond to the columns and rows of the matrix. The relationship between the documents D and the terms T is expressed such that if a given document Di contains a given term Tj, the j and i components of the DT matrix are set to "1"; otherwise, they are set to "0".

In this embodiment, this DT matrix is regarded as an expression form of a bipartite graph, and the DT matrix is transformed on the basis of the DM decomposition method used in the graph theory of bipartite graphs. The respective documents D are then classified on the basis of clusters appearing on the obtained transformed DT matrix.

The DT matrix generation unit 11 has a function of generating a DT matrix 23 from the respective documents D as classification targets and the respective terms constituting the term list 22, and a function of storing the generated DT matrix 23 in the storage unit 20.

The DT matrix transformation unit 12 has a function of transforming the DT matrix 23 generated by the DT matrix generation unit 11 on the basis of the DM (Dulumage-Mendelsohn) decomposition method, and a function of storing the transformed DT matrix 24 obtained by transformation in the storage unit 20.

The DM decomposition method is a process of transforming the DT matrix 23 into a triangular matrix by performing row operation (operation of interchanging rows) or column operation (operation of interchanging columns). The DT matrix transformed into the triangular matrix is called the transformed DT matrix 24.

The large classification generation unit 13 has a function of repeatedly executing DT matrix transformation processing, as clustering processing, in the DT matrix transformation unit 12 using the DM decomposition method, a function of generating large classifications of the respective documents of the document set 21 on the basis of the clusters obtained from the transformed DT matrix 24 obtained by each clustering process, and a function of storing the classification result as large classification data 25 in the storage unit 20.

The virtual representative generation unit 14 has a function of generating virtual representative documents virtually representing documents contained in the clusters from the clusters obtained from the transformed DT matrix 24 at the time of the generation of large classifications by the large classification generation unit 13.

The large classification label generation unit 15 has a function of generating labels indicating the classification contents of the respective clusters, i.e., the large classifications, generated by the large classification generation unit 13.

The display processing unit 16 has a function of reading in the large classification data 25 from the storage unit 20 in accordance with the completion of large classification generation by the large classification generation unit 13 and displaying/outputting the classification result in a tree structure using cluster symbols and link symbols on the screen display unit 40, and a function of acquiring a label indicating the contents of a cluster associated with a selected symbol from the large classification data 25 in accordance with selecting operation with respect to the cluster symbol or link symbol detected by the operation input unit 30 and displaying/outputting the label on the screen display unit 40.

In this embodiment, the large classification generation unit 13 causes the virtual representative generation unit 14 to perform generation, as clustering processing, of a virtual representative document for each cluster on the transformed DT matrix 24 generated from the DT matrix 23 by the DT matrix transformation unit 12, generates the new DT matrix 23 used for the next clustering processing by adding the virtual representative documents to the transformed DT matrix 24 and deleting the documents belonging to the clusters of the virtual representative documents from the transformed DT matrix 24, and outputs at least information associated with documents constituting each cluster as the large classification data 25. The large classification generation unit 13 also causes the display processing unit 16 to display, on the screen, the large classification result in a tree structure using cluster symbols indicating the clusters generated in the respective steps and link symbols indicating the integral relation between the clusters and clusters in different steps on the basis of the large classification data 25.

[DT Matrix Generation Operation]

The DT matrix generation operation of the sentence classification device according to this embodiment will be described next with reference to FIG. 2. FIG. 2 is a flowchart showing DT matrix generation processing by the sentence classification device according to this embodiment.

When causing the large classification generation unit 13 to generate large classifications of the document set 21 in the storage unit 20, the arithmetic processing unit 10 generates a DT matrix used for document classification processing. Matrix generation processing for the generation of a DT matrix will be described in detail below.

In the DT matrix generation processing in FIG. 2, first of all, the DT matrix generation unit 11 reads in the document set 21 stored in the storage unit 20 (step S100), and reads in the term list 22 (step S101).

FIG. 3 shows an example of the arrangement of the document set 21. This example is an aggregate of documents freely written about "stress" by many answerers on the Web. For each document D, a document number Di for the management of the document D and the identification information of the answerer who has written the document are assigned.

FIG. 4 shows an example of the arrangement of the term list 22. In the term list 22, the respective terms T are formed from the types of important words obtained by analyzing the respective documents D on the basis of a predetermined algorithm and from contextual relationships of the words. For each term T, a term number Tj for the management of the term T is assigned.

Each term T is comprised of a keyword front located on the front side of two important words and a keyword back located on the back side. For each keyword, a word indicating the content of the keyword and the part-of-speech attribute type of the word are defined. In addition, an importance indicating a weight in the use for document classification is made to correspond to each term T, which is calculated from the document set 21.

For example, term "1" is comprised of the two keywords "stress" and "relief", and their positional relationship is defined such that "stress" is located on the front side.

The DT matrix generation unit 11 checks, for each document in the document set 21, whether each term T of the term list 22 which has an importance equal to or more than a given threshold exists, and generates a DT matrix on the basis of the check result (step S102).

FIG. 5 shows an example of the arrangement of a DT matrix. In a DT matrix 23, the terms T are arranged in the row direction (vertical direction), and the documents D are arranged in the column direction (horizontal direction). At the intersection between each document D and the corresponding term T, the presence/absence of the term T in the document D is expressed by a binary number. In this case, if the term Tj exists in the document Di, "1" is set; otherwise, "0" is set.

In this example, therefore, it can be known that a document D1 contains terms T4 and T7, and a term T2 is contained in documents D2 and D4.

Subsequently, the DT matrix transformation unit 12 generates a transformed DT matrix 24 by transforming the DT matrix 23, generated by the DT matrix generation unit 11 in this manner, on the basis of the DM decomposition method (step S103), and stores the matrix in the storage unit 20, thereby terminating the series of matrix generation processes.

In general, according to the graph theory, the DM decomposition method is used as a technique of separating a bipartite graph comprising points belonging to two sets and edges connecting the points on the basis of the relevance between the respective points.

In this embodiment, in consideration of the fact that the DT matrix 23 can be regarded as an expression form of a bipartite graph in which the documents D are connected to the terms T with edges, the DM decomposition method in the graph theory is applied to the DT matrix 23, and the documents D are classified on the basis of the obtained transformed DT matrix.

[DM Decomposition Processing]

Figure 6:
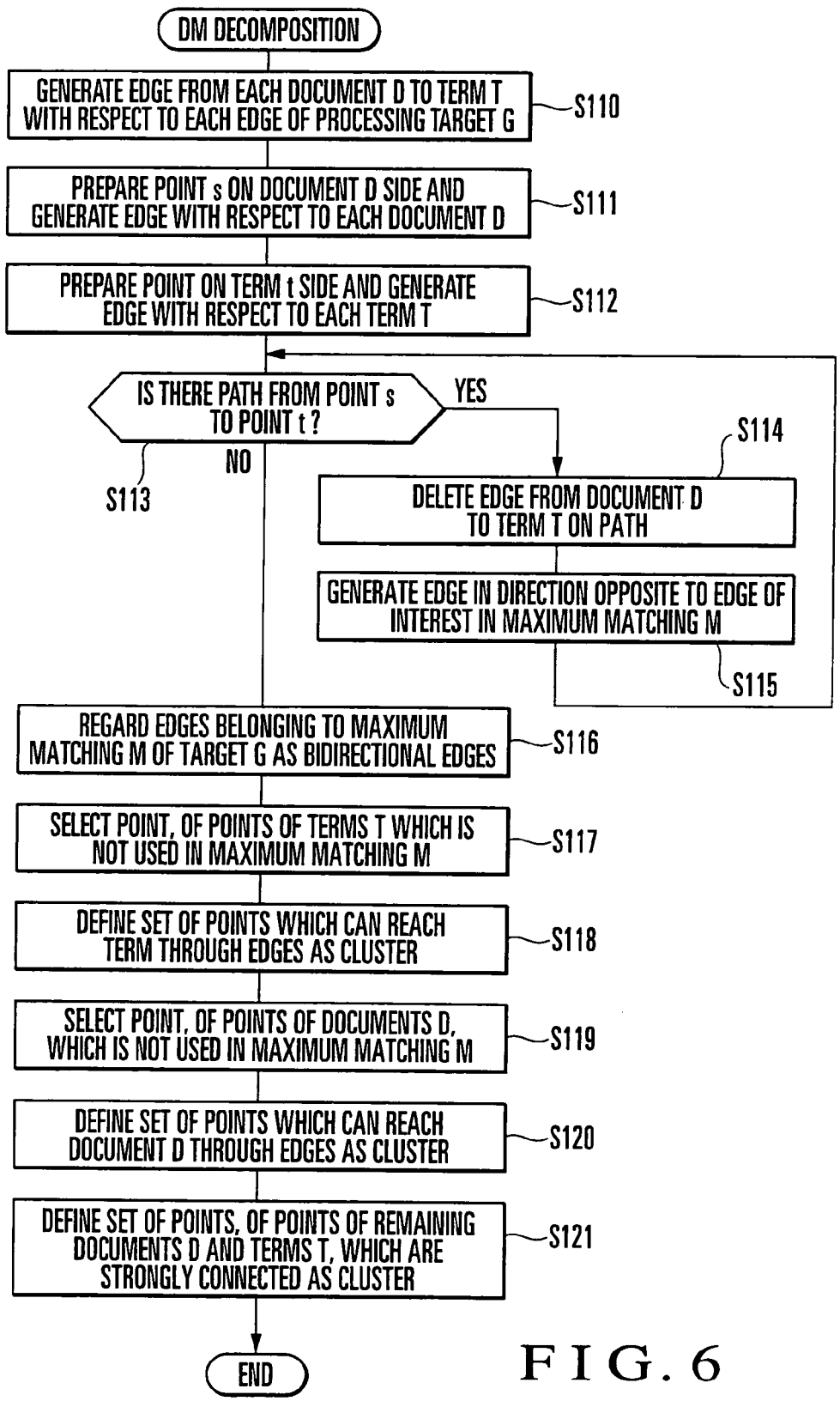
FIG. 6 is a flowchart showing DM decomposition processing.

DM decomposition processing in a bipartite graph used in the DT matrix transformation unit 12 will be described with reference to FIGS. 6 and 7A to 7F. FIG. 6 is a flowchart showing DM decomposition processing. FIGS. 7A to 7F are bipartite graphs showing the process of DM decomposition. The following description will exemplify a case wherein a bipartite graph G comprised of two point sets of the documents D and the terms T and edges connecting the points is regarded as a processing target, and the target is separated into a plurality of graphs by the DM decomposition method. Note that in these processes, the following operation is repeatedly performed: various kinds of data are read out from a memory in the arithmetic processing unit 10 or the storage unit 20, the arithmetic processing unit 10 performs predetermined computation for the data, and the resultant data are stored again.

Figure 7A:
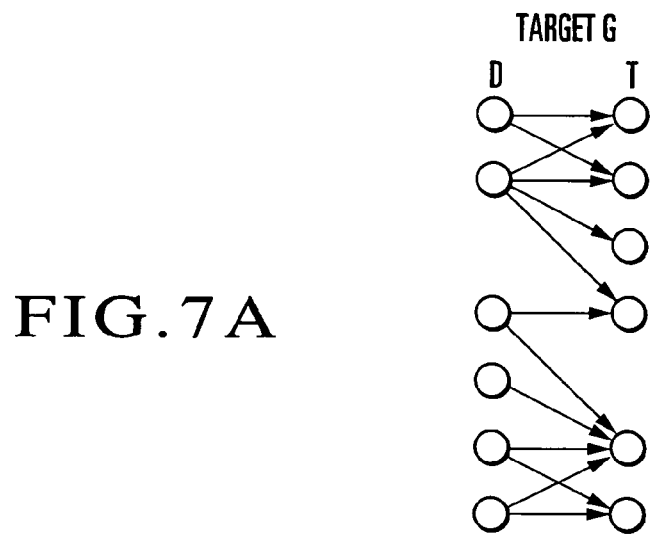
Figure 7B:
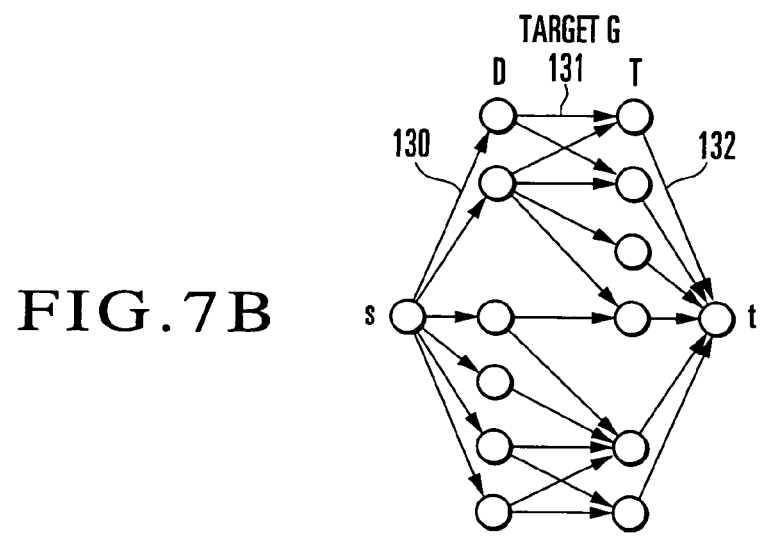

First of all, as shown in FIG. 7A, with regard to the respective edges of the bipartite graph G as the processing target, effective edges extending from the documents D to the terms T are generated (step S110). As shown in FIG. 7B, then, a point s is prepared on the document D side, and effective edges extending from the point s to the respective points of the documents D are generated (step S111). In the same manner, a point t is prepared on the term T side, and effective edges extending from the respective points of the terms T to the point t are generated (step S112).

Figure 7C:
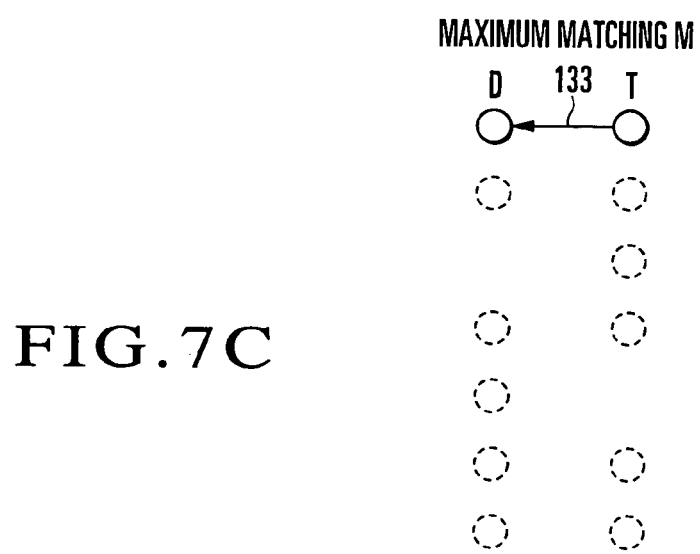

A search is then made for a path extending from the point s to the point t through these edges (step S113). For example, referring to FIG. 7B, the point t can be reached from the point s through the path comprising edges 130, 131, and 132. If such a path exists (step S113: YES), the respective edges constituting the path are deleted (step S114), and an effective edge in the direction opposite to the effective edge extending from the document D to the term T on the path is generated in a maximum matching M as an empty bipartite graph in the initial state (step S115). The flow then returns to step S113 to search for the next path. Referring to FIG. 7C, an effective edge 133 in the direction opposite to the effective edge 131 is generated in the maximum matching M.

If it is determined in step S113 that no new path is found upon completion of all path searches (step S113: NO), the maximum matching M is accomplished.

After the maximum matching M shown in FIG. 7D is accomplished, each effective edge 134 belonging to the maximum matching M is contained in the processing target G (step S116). As a consequence, as shown in FIG. 7E, each edge 135 selected as that of the maximum matching M is comprised of an effective edge extending from the document D to the term T and an effective edge in the opposite direction.

A point which is not used for the maximum matching M, e.g., a free point 136, is selected from the points of the terms T (step S117). Then, a set of points which can reach the free point 136 through the respective edges of the processing target G is defined as a cluster 140 (step S118).

Likewise, a point which is not used for the maximum matching M, e.g., a free point 137, is selected from the points of the documents D (step S119), and a set of points which can reach the free point 137 through the respective edges of the processing target G is defined as a cluster 142 (step S120).

Of the points of the remaining documents D and terms T, a set of points having paths through which they can reach each other in the two directions, i.e., a set of strongly connected points, is defined as a cluster 141 (step S121), thus terminating the series of DM decomposition processes.

In this manner, according to the known DM decomposition method, clusters are generated in a predetermined order to obtain a transformed DT matrix in the form of a triangular matrix as shown in FIG. 7G.

In the above manner, the arithmetic processing unit 10 executes the DT matrix generation processing in FIG. 2 to cause the DT matrix generation unit 11 to generate the DT matrix 23 from the document set 21 and the term list 22. The arithmetic processing unit 10 also causes the DT matrix transformation unit 12 to apply the DM decomposition processing in FIG. 6 to the DT matrix to generate the transformed DT matrix 24 in which the respective documents D are separated for the respective clusters.

Figure 8:
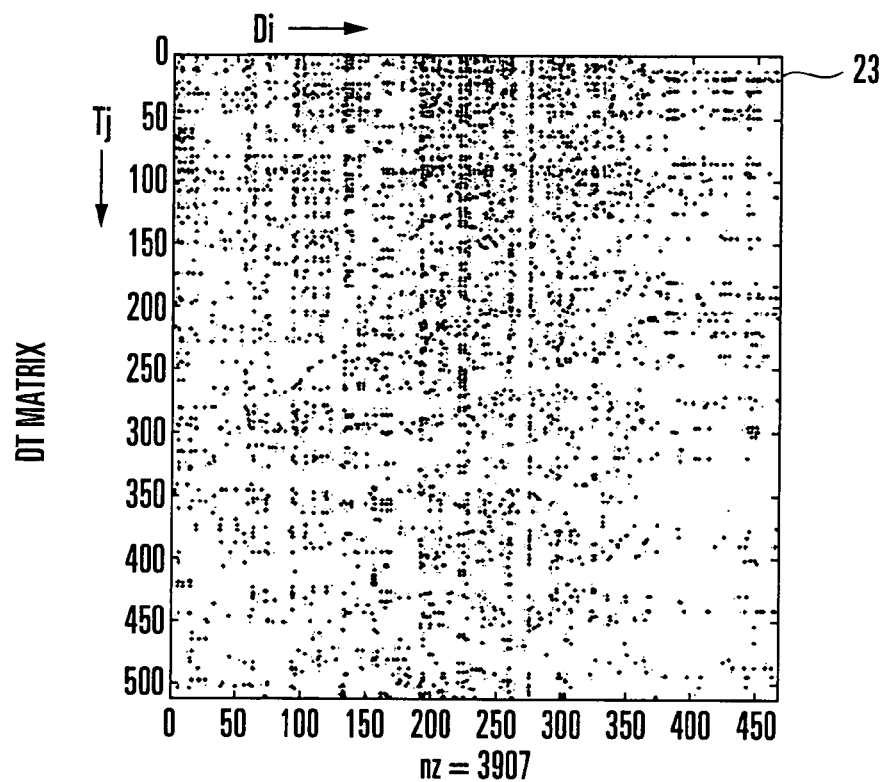
FIG. 8A is a view showing an example of a DT matrix.
FIG. 8B is a view showing an example of a transformed DT matrix.
Figure 8:
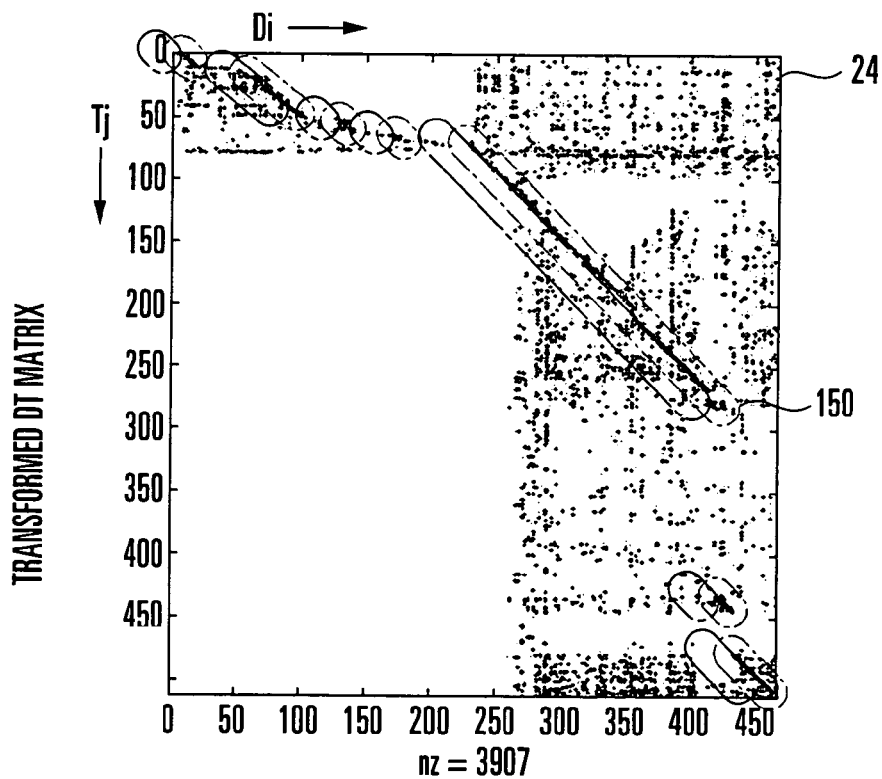

FIG. 8A shows an example of the DT matrix 23. FIG. 8B shows an example of the transformed DT matrix 24. In this case, if a term Tj exists in a given document Di, a dot is placed at the intersection between the document Di placed in the column direction (horizontal direction) and the term Ti placed in the row direction (vertical direction); otherwise, a blank is placed at the intersection. In the DT matrix 23 in FIG. 8A, dots are randomly distributed. In the transformed DT matrix 24 in FIG. 8B, dots are continuously and densely placed in an oblique direction in a fragmentary manner, and it is known that clusters are arrayed in a portion 150. In the transformed DT matrix 24, no dot exists on the lower left side, and many dots exist on the upper right side, so it is known that an upper triangular matrix is formed.

[Large Classification Operation]

Figure 9:
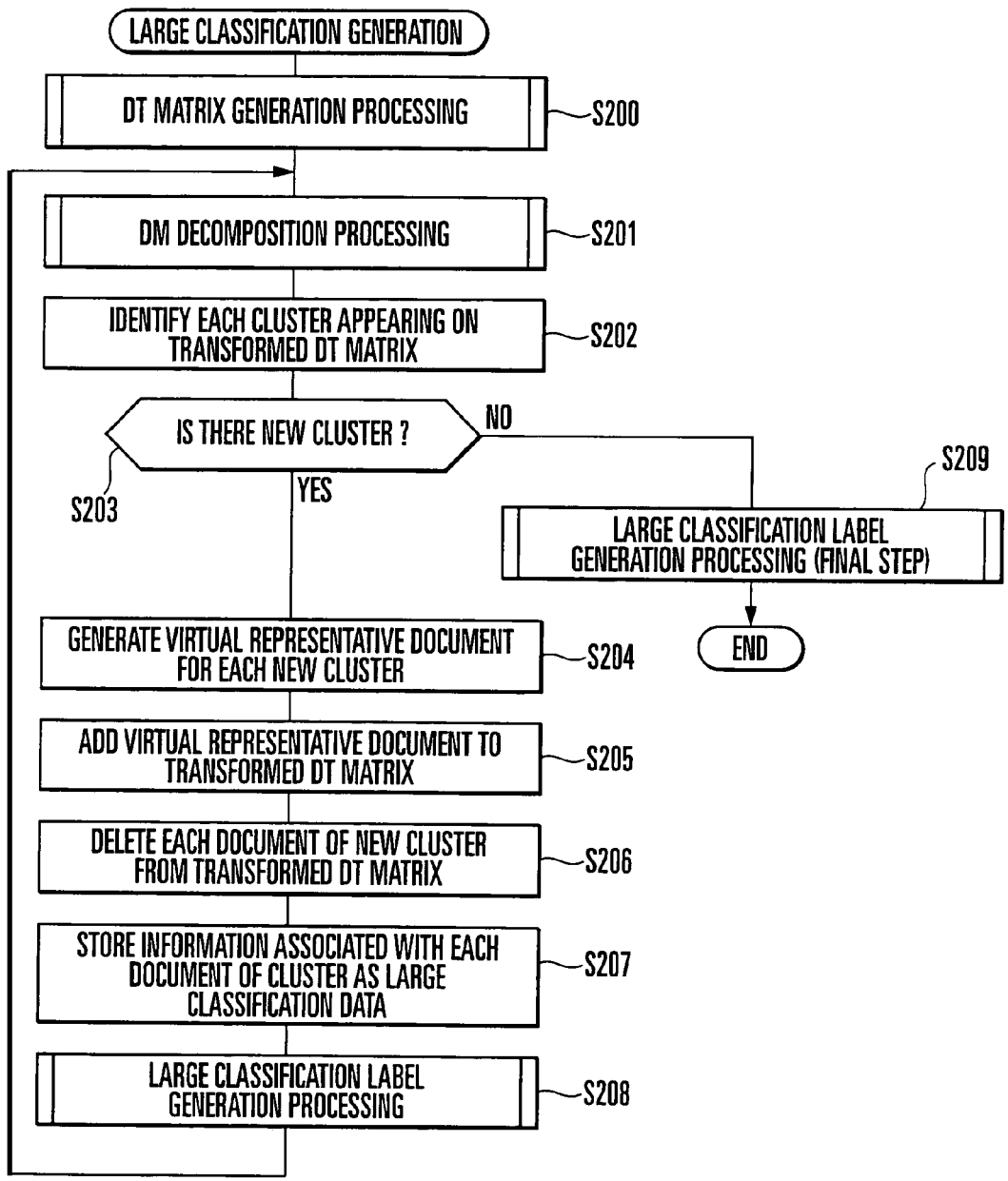
FIG. 9 is a flowchart showing large classification generation processing by the sentence classification device according to the first embodiment of the present invention.

The large classification operation of the sentence classification device according to the first embodiment of the present invention will be described next with reference to FIG. 9. FIG. 9 is a flowchart showing large classification processing in the sentence classification device according to the first embodiment of the present invention.

The arithmetic processing unit 10 starts the large classification generation processing in FIG. 9 by using the large classification generation unit 13 in accordance with an instruction from an operation input unit 30.

First of all, the large classification generation unit 13 reads a document set 21 and term list 22 stored in a storage unit 20 by using a DT matrix generation unit 11, and generates a DT matrix 23 two-dimensionally expressing the relationship between the respective documents and the respective terms by performing DT matrix generation processing like that described above (step S200).

The large classification generation unit 13 generates a transformed DT matrix 24, in which the respective documents are separated for each cluster, by applying the DM decomposition method in the graph theory to the above DT matrix 23 using a DT matrix transformation unit 12 in the same manner as described above (step S201).

The large classification generation unit 13 identifies each cluster block on the obtained transformed DT matrix 24 (step S202). In this case, each cluster may be identified on the basis of a bipartite graph separated at the time of the generation of the transformed DT matrix 24, or may be identified from a row of data (dots) on the transformed DT matrix 24.

Figure 10:
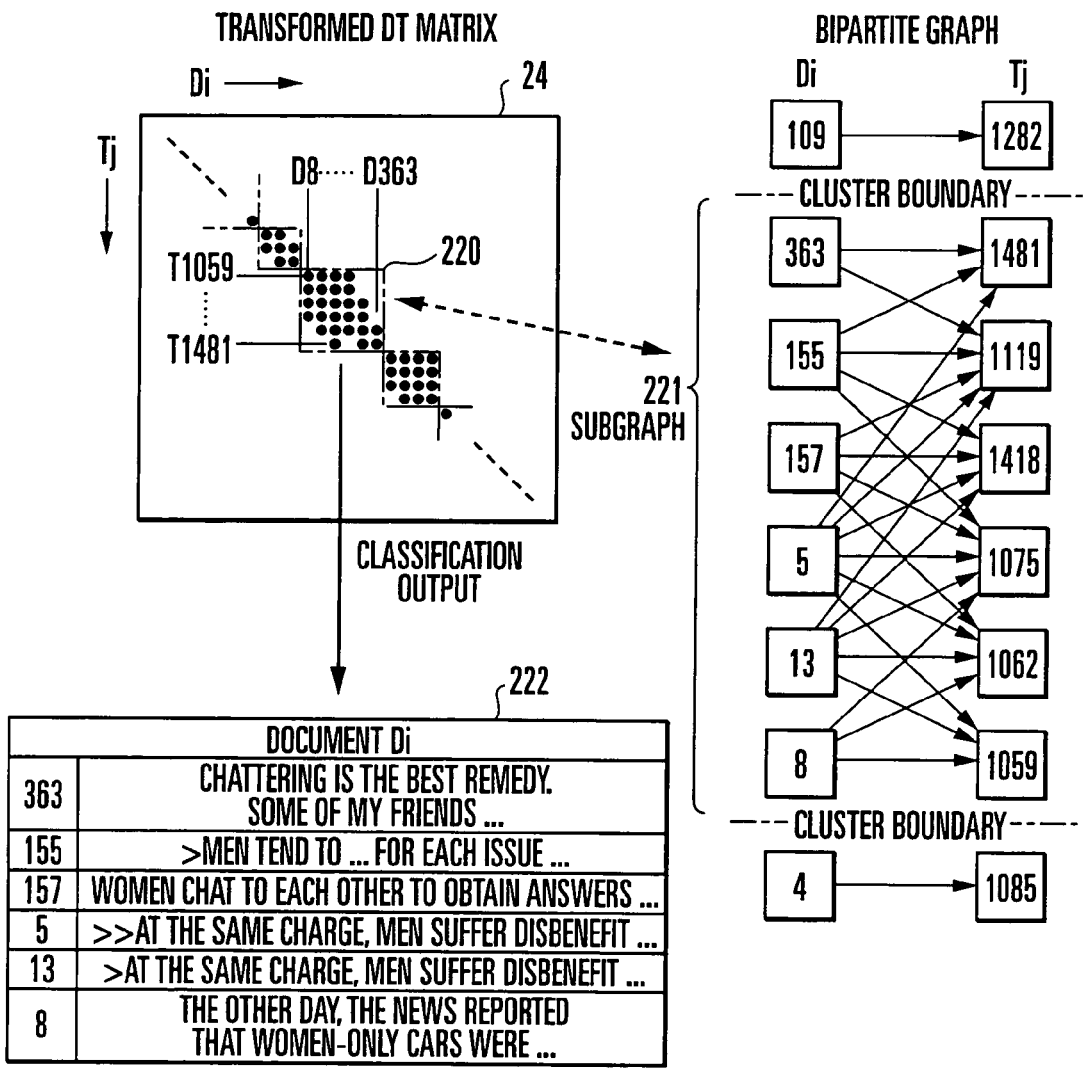
FIG. 10 is a view for explaining document classification processing.

FIG. 10 is a view for explaining document classification processing. In this case, a cluster 220 exists on the transformed DT matrix 24. The cluster 220 forms a subgraph 221 expressed by a bipartite graph, and has little relevance with other documents and terms. Note that this cluster sometimes forms a complete graph with clear cluster boundaries. In the transformed DT matrix 24, the documents D are arranged in the column direction (horizontal direction), and the documents D arranged in the column direction in the cluster 220, i.e., documents D363, D155, D157, D5, D13, and D8, are the documents D belonging to the cluster 220.

If a new cluster is identified (step S203: YES), a virtual representative document virtually representing the cluster for each new cluster is generated by using the virtual representative generation unit 14.

First of all, the virtual representative generation unit 14 acquires the feature amounts of the respective documents belonging to the new cluster, and generates a virtual representative document from the sum-set of the feature amounts. If, for example, a feature amount Ki of each document is expressed by one or more feature amounts k1 to kn as indicated by Ki={k1, k2, . . . , kn}, a virtual representative document K' can be obtained by K'=K1∪K2∪ . . . ∪Km.

In this case, if, for example, terms are used as feature amounts as described above, a virtual representative document is a sum-set containing all the terms which the documents belonging to the new cluster have. The contents of this sum-set are a list of keywords constituting the respective terms.

The large classification generation unit 13 generates a virtual representative document for each new cluster by using the virtual representative generation unit 14 in the above manner, and assigns a new document number to each document (step S204). The large classification generation unit 13 adds these virtual representative documents to the transformed DT matrix as the same documents as other actual documents (real documents) (step S205). The large classification generation unit 13 then deletes the respective documents belonging to the new clusters from the transformed DT matrix (step S206).

With this processing, on the transformed DT matrix, dots are additionally placed at the intersections between the virtual representative documents and the respective terms contained in the documents, and the dots corresponding to the respective original documents are deleted, thereby generating a new DT matrix in which the respective documents constituting the new clusters are replaced with the virtual representative documents.

Subsequently, the large classification generation unit 13 outputs, as large classification data 25, the arrangement of each new cluster, e.g., information associated with the respective documents constituting the cluster, for example, the real documents belonging to the cluster, the document ID of the virtual representative document, and a hierarchical level corresponding to the number of steps, and stores the data in the storage unit 20 (step S207). With respect to the virtual representative document contained in the new cluster, the large classification generation unit 13 then performs large classification label generation processing (to be described later) using the large classification label generation unit 15 for the cluster on which the virtual representative document is based (step S208).

In this manner, in steps S201 to S208 which are regarded as one step, a new cluster is generated by performing transformation processing for a DT matrix, and clustering processing is executed, in which a new DT matrix is generated by replacing the cluster with a virtual representative document. Thereafter, the flow returns to step S201 to repeatedly execute clustering processing using the new DT matrix.

With this processing, each cluster generated in a repetitive step of clustering processing contains not only real documents but also virtual representative documents, i.e., other clusters, thereby obtaining a large classification of the respective documents by integrating the real documents and clusters, and the new clusters.

Figure 11:
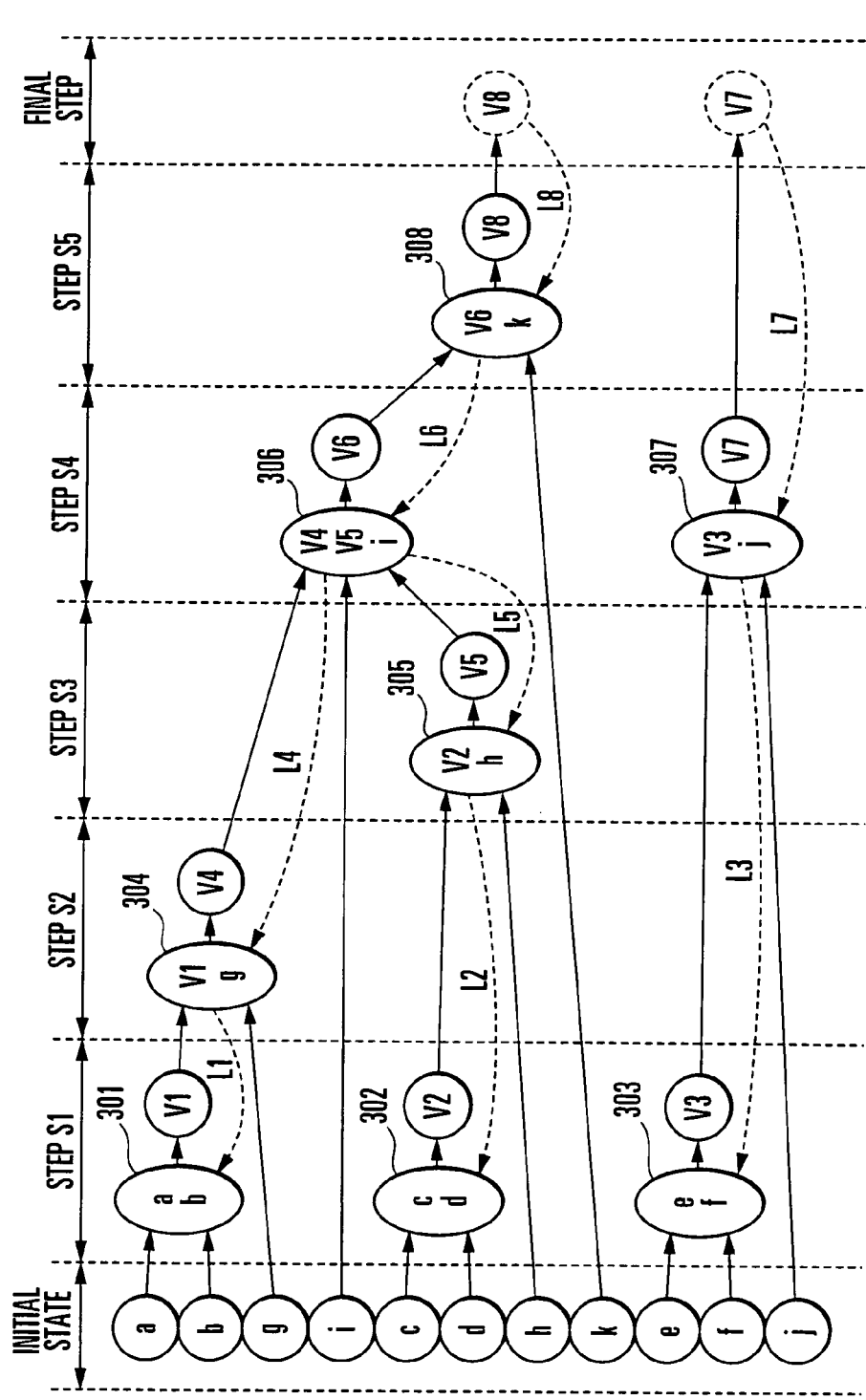
FIG. 11 is a view for explaining an example of execution of large classification generation processing.

FIG. 11 explains an execution example of large classification generation processing. Assume that in the initial state, documents a to k are stored in the document set 21 in the storage unit 20. In step S1 which is the first clustering processing, a cluster 301 is generated from the documents a and b, and a virtual representative document V1 of the cluster is generated. Likewise, a cluster 302 is generated from the documents c and d, and a virtual representative document V2 of the cluster is generated. In addition, a cluster 303 is generated from the documents e and f, and a virtual representative document V3 of the cluster is generated.

With this operation, at the end of step S1, the documents a, b, c, d, e, and f are deleted from the DT matrix, and step S2 is executed by using a new DT matrix comprising the documents g to k and the virtual representative documents V1, V2, and V3.

In second step S2, a cluster 304 is generated from the virtual representative document V1 and the document g, and a virtual representative document V4 of the cluster is generated.

[Large Classification Label Generation Operation]

In this case, in the large classification label generation processing in step S208 in FIG. 9, since the virtual representative document V1 is contained in the cluster 304, a large classification label for the cluster 301 on which the virtual representative document V1 is based is generated.

Figure 12:
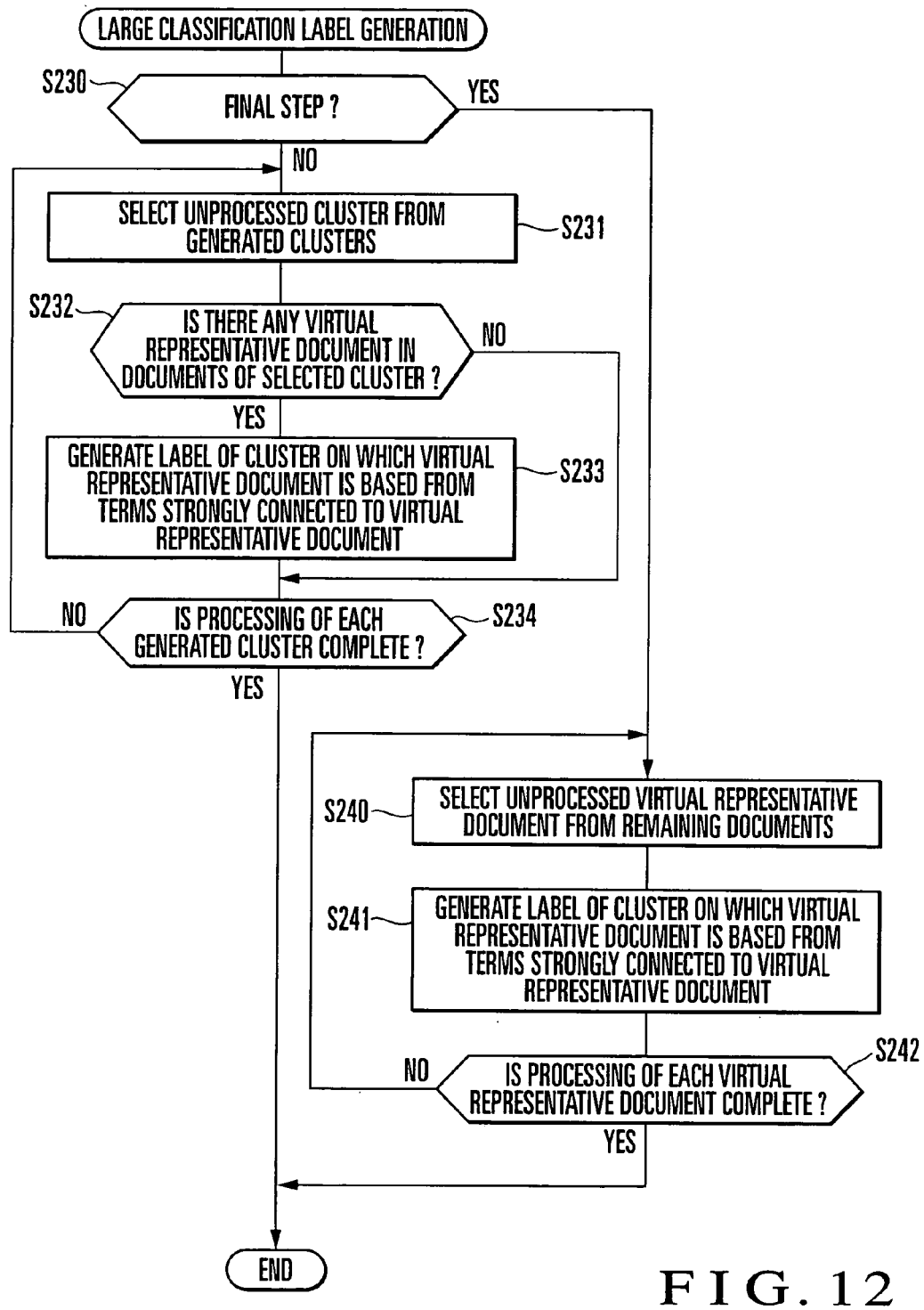
FIG. 12 is a flowchart showing large classification label generation processing by the sentence classification device according to the first embodiment of the present invention.

Large classification label generation processing will be described with reference to FIG. 12. FIG. 12 is a flowchart showing large classification label generation processing in the sentence classification device according to the first embodiment of the present invention.

First of all, the large classification label generation unit 15 determines whether the current step in the large classification generation processing is the final step in which no new cluster is found (step S230).

If the current step is not the final step (step S230: NO), one of the new clusters identified in step S202 in FIG. 9 is arbitrarily selected, for which the label generation processing has not been performed (step S231), and it is determined whether any virtual representative document is contained in the selected cluster (step S232). It suffices to identify a real document and a virtual representative document with their document numbers or the like.

In this case, only when a virtual representative document is contained in the cluster (step S232: YES), a label indicating the contents of the cluster on which the virtual representative document is based is generated from the keywords of terms (terms contained in the virtual representative document) strongly connected to the virtual representative document on the DT matrix (step S233).

If there is any cluster for which the label generation processing has not been performed (step S234: NO), the flow returns to step S231 to repeatedly execute the label generation processing in steps S231 to S233 for the unprocessed cluster. When the processing for each cluster is complete (step S234: YES), the series of large classification generation processes is terminated.

If it is determined in step S230 that the current step in the large classification generation processing is the final step (step S230: YES), one virtual representative document for which the label generation processing has not been performed is arbitrarily selected from the respective documents constituting the DT matrix at the end of the final step (step S240), and a label for the cluster on which the virtual representative document is based is generated from the keywords of terms strongly connected to the virtual representative document on the DT matrix (step S241).

If there is any virtual representative document for which the label generation processing has not been performed (step S242: NO), the flow returns to step S240 to repeatedly execute the label generation processing in steps S240 and S241 for the unprocessed virtual representative document (step S242: YES), thus terminating the series of large classification generation processes.

In step S2 in FIG. 11, since the virtual representative document V1 is contained in the cluster 304, a label L1 for the cluster 301 on which the virtual representative document V1 is based is generated from the keywords of terms strongly connected to the virtual representative document V1 on the DT matrix at the start of processing in step S2.

Subsequently, in the same manner as described above, in step S3, a cluster 305 is generated from the virtual representative document V2 and the document h, and a virtual representative document V5 of the cluster is generated. A label L2 for the cluster 305 on which the virtual representative document V2 is based is generated.

In step S4, a cluster 306 is generated from the virtual representative documents V4 and V5 and the document i, and a virtual representative document V6 of the cluster is generated. In addition, a cluster 307 is generated from the virtual representative document V3 and the document j, and a virtual representative document V7 of the cluster is generated. A label L4 for the cluster 304 on which the virtual representative document V4 is based is generated. In addition, a label L5 for the cluster 305 on which the virtual representative document V5 is based is generated. Furthermore, a label L3 for the cluster 303 on which the virtual representative document V3 is based is generated.

In step S5, a cluster 308 is generated from the virtual representative document V6 and the document k, and a virtual representative document V8 of the cluster is generated. A label L6 for the cluster 306 on which the virtual representative document V6 is based is then generated.

The large classification generation unit 13 repeatedly executes the clustering processing (steps S201 to S208) in this manner. If no new cluster is found in step S203 in FIG. 9 (step S203: NO), large classification label generation processing is executed as the final step for the cluster to which no large classification label is attached (step S209), thus terminating the series of large classification generation processes.

With this operation, in the final step in FIG. 11, a label L8 for the cluster 308 on which the virtual representative document V8 is based is generated from the keywords of terms strongly connected to the virtual representative document V8 on the DT matrix at this point of time. In the same manner, a label L7 for the cluster 307 on which the virtual representative V7 is based is generated.

Figure 13:
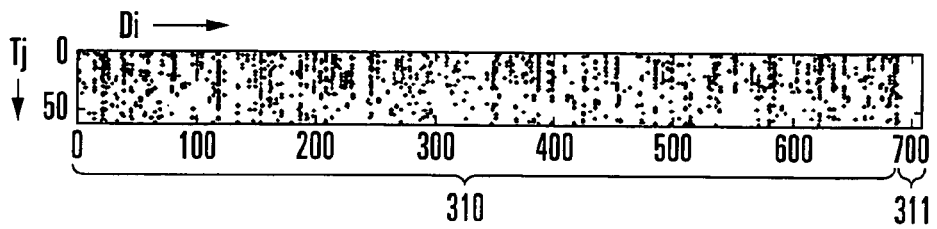
FIG. 13 is a view showing an example of generating a DT matrix in an initial state.

FIG. 13 shows an example of how a DT matrix is generated in the initial state. If a term Tj exists in each document Di, dots are placed at the intersections between the documents Di placed in the column direction (horizontal direction) and the terms Tj placed in the row direction (vertical direction). If no term Tj exists in any document, a blank is placed at the corresponding intersection. Note that in this DT matrix, real documents are placed along the abscissa in an area 310, and an area 311 is a blank in the initial state because a virtual representative document is to be placed in this area.

Figure 14:
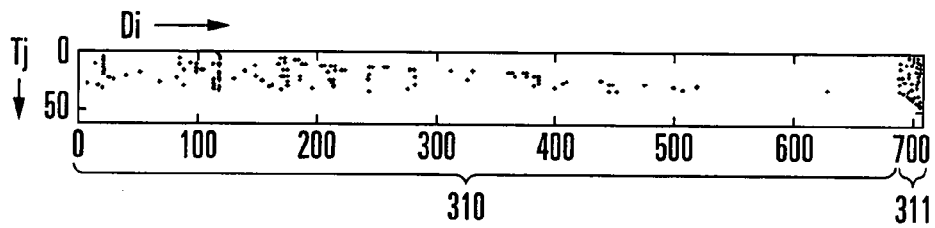
FIG. 14 is a view showing an example of generating a DT matrix in the final step.

FIG. 14 shows an example of how a DT matrix is generated in the final step. Obviously, in this example, real documents are deleted from the area 310 to make the area almost blank by the large classification generation processing, and the blank in the area 311 is replaced with a virtual representative document.

In this manner, since clustering processing of generating a new cluster by performing transformation processing with respect to a DT matrix and generating a new DT matrix by replacing the cluster with its virtual representative document is repeatedly executed, new clusters, i.e., larger clusters including clusters, i.e., large classifications, can be sequentially obtained from new DT matrices.

With this operation, as the large classification data 25 in the storage unit 20, as shown in FIG. 11, not only a classification having only each of the documents a to k as an element, e.g., the clusters 301 to 303, but also the clusters 304 to 308 as a larger classification containing one or more clusters, i.e., a large classification, can be obtained.

In addition, since the above clustering processing is repeatedly executed until no new cluster is identified on a DT matrix, hierarchical clustering is performed from each document in a bottom-up manner, and the hierarchical relationship between the clusters 301 to 308, i.e., the large classifications, can be visualized as a tree structure.

Although the above description has exemplified the case wherein large classification label generation processing (steps S208 and S209) is performed in the large classification generation processing (see FIG. 9), this large classification label generation processing need not be performed in cooperation with large classification generation processing. After large classification processing is complete, large classification label generation processing (see FIG. 12) may be independently performed, as needed.

[Large Classification Display Operation]

After the large classification generation unit 13 performs large classification of the document set 21 in the storage unit 20 in this manner, the arithmetic processing unit 10 of the sentence classification device causes the display processing unit 16 to display the large classification result on the screen display unit 40.

Figure 15:
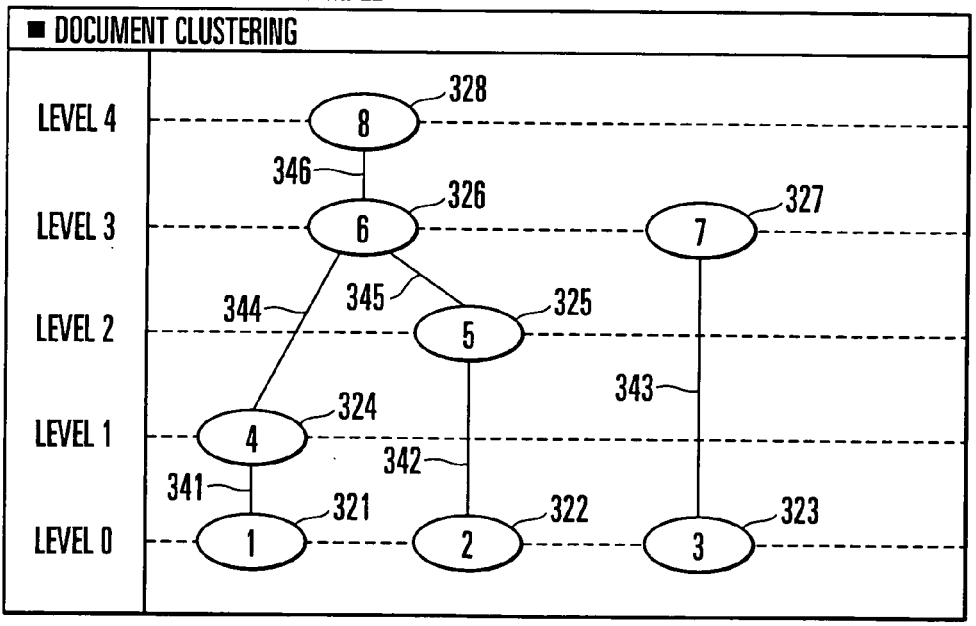
FIG. 15 is a view showing an example of a display window for a large classification result.

FIG. 15 shows an example of a display window for a large classification result. According to this display window example, levels 0 to 4 indicating the hierarchy of large classifications are arranged in the vertical direction on the screen. Levels 0 to 4 correspond to the clustering processes, i.e., the respective steps, repeatedly executed in the large classification generation processing. Note that the spread of the tree structure is displayed in the horizontal direction of the display output area, and no specific meaning is given to the display order of data in this direction and the like.

In the case shown in FIG. 11 described above, clusters 301, 302, and 303 are generated in step S1 which is the first clustering process. The display processing unit 16 arranges cluster symbols 321, 322, and 323 comprising, for example, elliptical display symbols (display objects) indicating these clusters 301, 302, and 303 at level 0 corresponding to step S1 in the display output area.

Likewise, a cluster symbol 324 indicating a cluster 304 generated in step S2 is placed at level 1, a cluster symbol 325 indicating a cluster 305 generated in step S3 is placed at level 2, cluster symbols 326 and 327 indicating clusters 306 and 307 generated in step S4 are placed at level 3, and a cluster symbol 328 indicating a cluster 308 generated in step S5 is placed at level 4.

The display processing unit 16 also arranges link symbols comprising linear display symbols (display objects) linking the respective cluster symbols between the respective cluster symbols to display the integral relation between the clusters 301 to 308.

For example, in the example shown in FIG. 11, the cluster 301 is integrated with the cluster 304, and a link symbol 341 indicating the integral relation between the clusters 301 and 304 is placed between the cluster symbols 321 and 324 corresponding to the clusters 301 and 304.

Likewise, a link symbol 342 indicating the integral relation between the clusters 302 and 305 is placed between the cluster symbols 322 and 325 corresponding to the clusters 302 and 305. A link symbol 343 indicating the integral relation between the clusters 303 and 307 is placed between the cluster symbols 323 and 327 corresponding to the clusters 303 and 307. A link symbol 344 indicating the integral relation between the clusters 304 and 306 is placed between the cluster symbols 324 and 326 corresponding to the clusters 304 and 306. A link symbol 345 indicating the integral relation between the clusters 305 and 306 is placed between the cluster symbols 325 and 326 corresponding to the clusters 305 and 306. A link symbol 346 indicating the integral relation between the clusters 306 and 308 is placed between the cluster symbols 326 and 328 corresponding to the clusters 306 and 308.

The display processing unit 16 arranges these cluster symbols and link symbols in the display output area on the basis of the large classification data 25 in the storage unit 20. FIG. 16 shows an example of the arrangement of large classification data. In this case, for each cluster ID as the identification information of each cluster, there is registered a combination of a level to which the cluster belongs, a virtual representative document ID as the identification information of a virtual representative document generated in the cluster, an element document ID as identification information of an element document integrated in the cluster, and a large classification label attached to the cluster.

The display processing unit 16 refers to the levels of the respective clusters to arrange the respective cluster symbols at corresponding positions in the display output area in the vertical direction, and displays the cluster IDs on the cluster symbols. When arranging the respective cluster links, the display processing unit 16 refers to the virtual representative document ID of an arbitrary cluster to search for a cluster ID which has the virtual representative ID as an element document ID, and places a link symbol to link the cluster symbols of these clusters. For example, the virtual representative document ID of the cluster with cluster ID "1" is "101", which matches one of the element document IDs of the cluster with cluster ID "7". Therefore, a link symbol is placed between the cluster symbols with cluster ID "1" and cluster ID "7".

In this case, the display processing unit 16 attaches symbol IDs as unique identification information to these cluster symbols and link symbols, and stores data associated with the symbols as symbol data 26 in the storage unit 20.

FIG. 17 shows an example of the arrangement of symbol data. In this case, for each symbol ID as identification information of each symbol, a combination of the symbol type (cluster/link) of the symbol and a cluster ID corresponding to the symbol is registered.

For example, symbol ID "C1" is the cluster symbol of cluster ID "1", and symbol ID "L1" is a link symbol which links cluster ID "1" to cluster ID "7".

Figure 18:
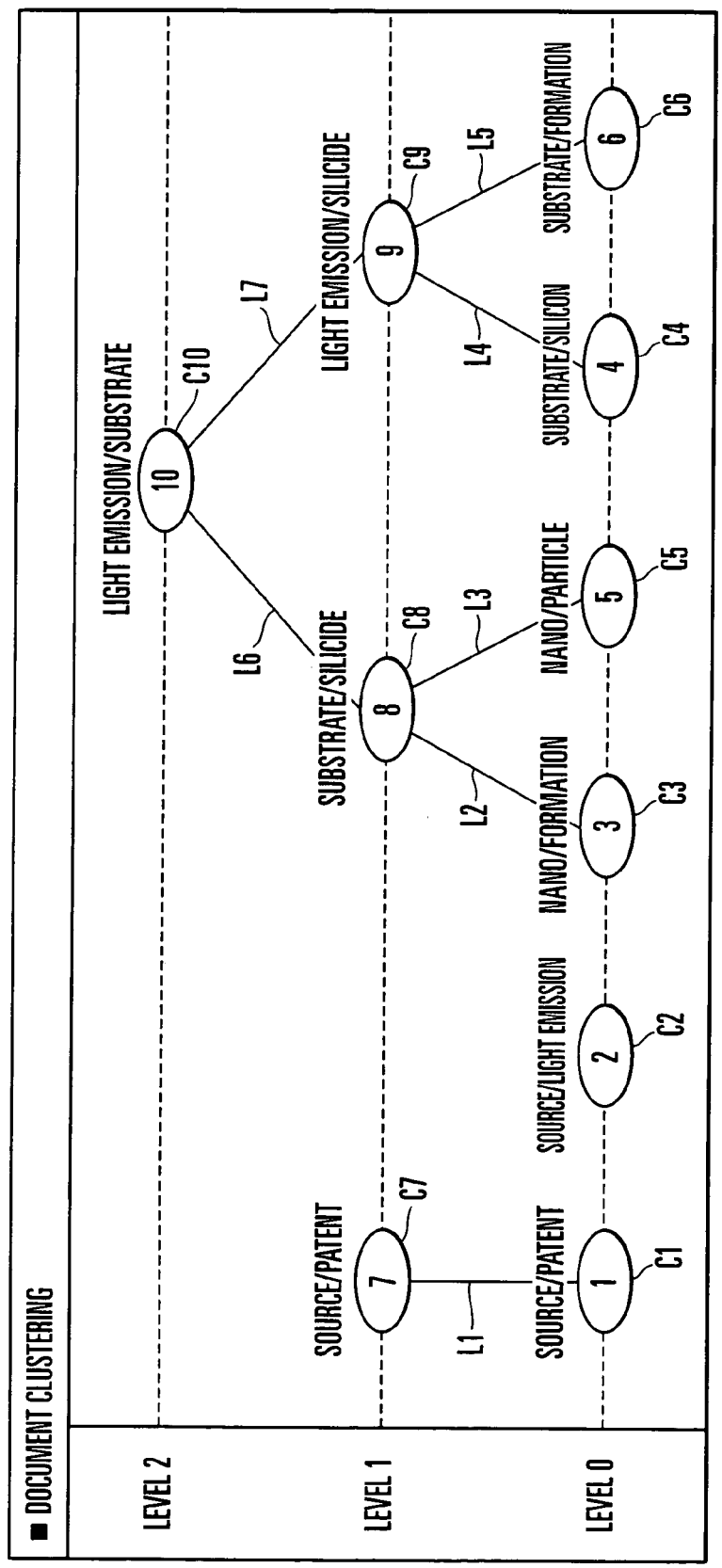
FIG. 18 is a view showing an example of displaying the large classification data in FIG. 16 on a screen.

FIG. 18 shows an example of how the large classification data in FIG. 16 is displayed on the screen. Cluster symbols C1 to C10 corresponding to the respective clusters (ID=1 to 10) are arranged at the corresponding levels, and are connected to each other through link symbols L1 to L7 on the basis of the integral relation between the respective clusters.

Cluster IDs are respectively displayed on the cluster symbols C1 to C10, and the large classification labels of the clusters are displayed around the cluster symbols C1 to C10.

In this embodiment, the large classification generation unit 13 causes the virtual representative generation unit 14 to perform generation, as clustering processing, of a virtual representative document for each cluster on the transformed DT matrix 24 generated from the DT matrix 23 by the DT matrix transformation unit 12, generates the new DT matrix 23 used for the next clustering processing by adding the generated virtual representative documents to the transformed DT matrix 24 and deleting the documents belonging to the clusters of the virtual representative documents from the transformed DT matrix 24, and outputs at least information associated with documents constituting each cluster as the large classification data 25. The large classification generation unit 13 also causes the display processing unit 16 to display, on the screen, the large classification result in a tree structure using cluster symbols indicating the clusters generated in the respective clustering processes and link symbols indicating the integral relation between clusters in different steps on the basis of the large classification data 25.

This makes it possible to automatically obtain clusters not only as classifications including only original documents as elements but also as larger classifications each including one or more clusters, i.e., larger classifications, from a document set. By repeating such clustering processing, hierarchical clustering is realized from each document in a bottom-up manner.

In addition, the hierarchical relationship between the respective clusters, i.e., the large classifications, can be displayed on the screen as a tree structure. The importance of each document and the relationship between the documents can be automatically visualized.

The technique of simultaneously determining hierarchical clustering and the labels of clusters in this embodiment can be regarded as a conceptual clustering method in natural language. For example, in the case shown in FIG. 18, large classification generation processing is applied to a plurality of patent specifications associated with light-emitting elements and prepared as the document set 21. As a result, these patent specifications are classified into hierarchical clusters having concepts indicated by unique labels at levels 0, 1, and 2 corresponding to a subordinate concept, intermediate concept, and superordinate concept, and the integral relation between these clusters can be easily grasped as global information.

Second Embodiment

Figure 19:
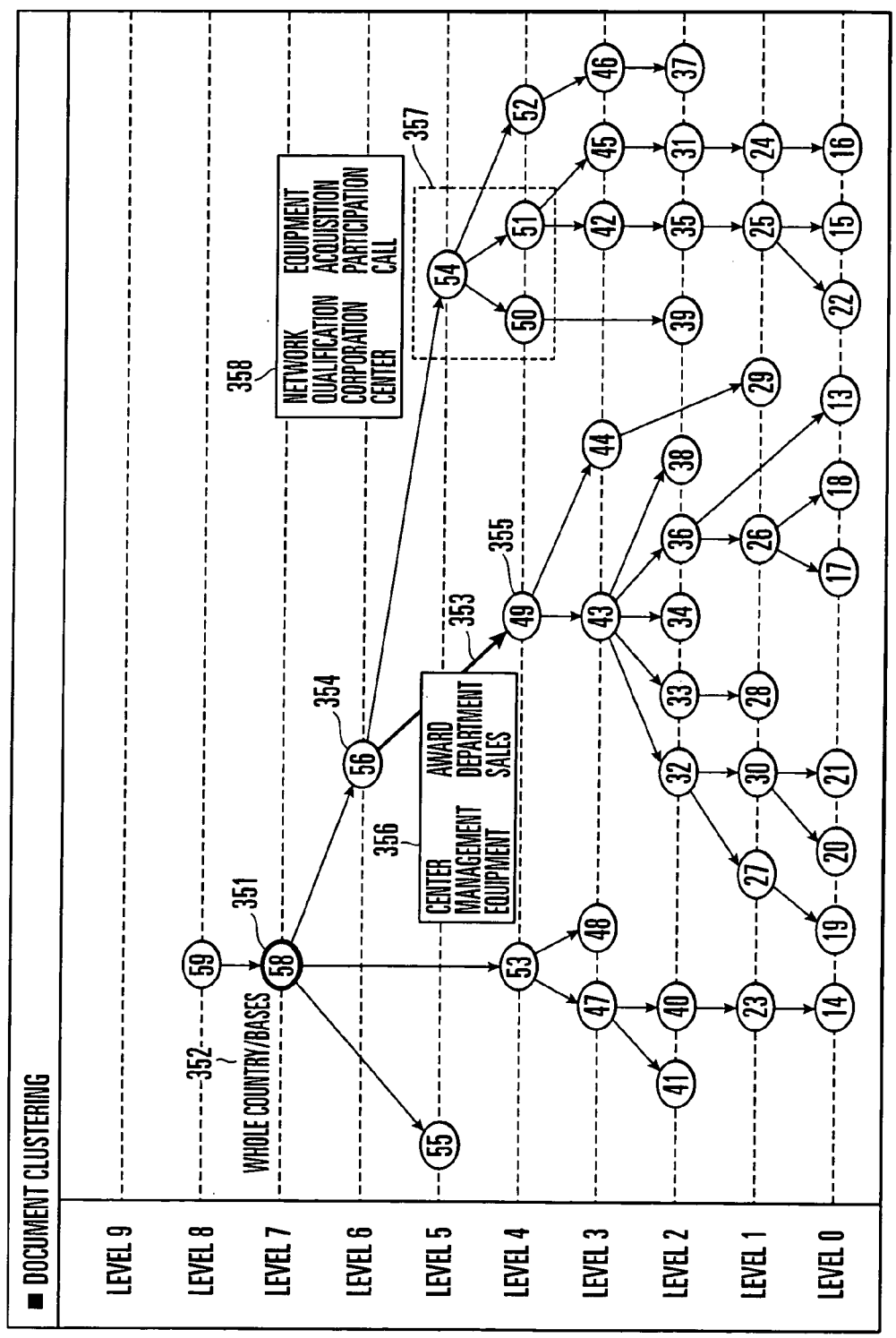
FIG. 19 is a view showing an example of a window output displaying the label display operation of a sentence classification device according to the second embodiment of the present invention.

A sentence classification device according to the second embodiment of the present invention will be described next with reference to FIG. 19. FIG. 19 shows an example of a window output which indicates the label display operation of the sentence classification device according to the second embodiment of the present invention.

The first embodiment has exemplified the case wherein the respective clusters obtained by large classification processing are displayed in the form of a tree structure on the screen. This embodiment will exemplify a case wherein a label is displayed as detailed information associated with an arbitrary cluster as a component of this tree structure. Note that the overall arrangement of the sentence classification device according to this embodiment is the same as that of the first embodiment except that the function to be described below is added to the display processing unit 16, and hence a detailed description thereof will be omitted.

While a large classification generation result is displayed in a display output area of a screen display unit 40, an arithmetic processing unit 10 of a sentence classification device 1 causes a display processing unit 16 to display a label indicating the contents of a selected symbol on the screen display unit 40 in accordance with selecting operation with respect to an arbitrary cluster symbol or link symbol as a component of the tree structure. In this case, as for selecting operation with respect to an arbitrary symbol, for example, it suffices if mouse operation is detected by an operation input unit 30, and is detected as an event with respect to the symbol (object) by the display processing unit 16 through the OS (Operating System) of the arithmetic processing unit 10.

If, for example, selecting operation with respect to a cluster symbol 315 in FIG. 19 is detected, the display processing unit 16 acquires a cluster ID of a symbol type corresponding to the symbol ID of the cluster symbol 351 by referring to symbol data 26 in a storage unit 20. In this case, since the symbol type is a cluster, the label of the cluster, "whole country/bases" in this case, is acquired by referring to large classification data 25 using the cluster ID, and is displayed as a label 352 at a position near the cluster symbol 351 on the screen.

If selecting operation with respect to the respective cluster symbols belonging to a selection range 357 in FIG. 19 is detected, the display processing unit 16 acquires the cluster IDs of symbol types corresponding to the symbol IDs of the cluster symbols by referring to the symbol data 26 in the storage unit 20. In this case, the display processing unit 16 acquires logical sum set "network/equipment, qualification/acquisition, corporation/participation, center/call" of the labels of these clusters, and displays it as a label 358 at a position near the selection range 357 on the screen.

If a plurality of clusters are simultaneously selected, an operation menu for designating a method of selecting the labels of these clusters may be displayed on the screen to display the clusters by a desired selection method. In this case, an operation menu may be displayed on the screen in accordance with the selection of a plurality of clusters. For example, an operation menu may be displayed on the screen in accordance with explicit operation by the operator, e.g., mouse right button clicking.

Figure 20:
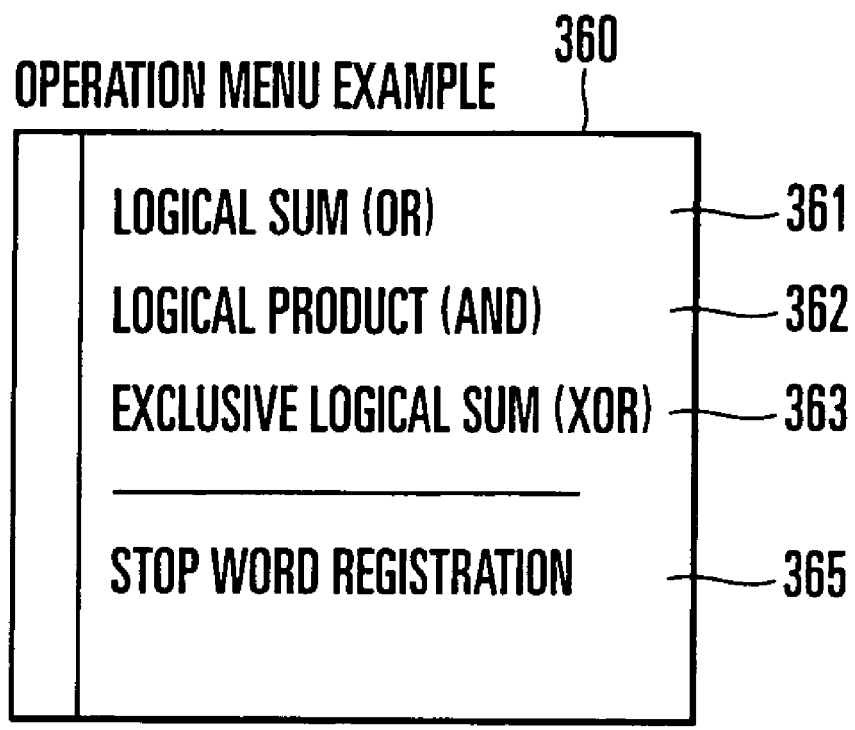
FIG. 20 is a view showing an example of displaying an operation menu.

FIG. 20 shows an example of how an operation menu 360 is displayed. In this case, in addition to logical sum (OR) with respect to the labels of a plurality of clusters, the operator can designate logical product (AND) for selecting only clusters of the same label or exclusive logical sum (XOR) for selecting only clusters of different labels. This makes it possible to easily grasp the relationship between a plurality of clusters.

If selecting operation with respect to a link symbol 353 in FIG. 19 is detected, the display processing unit 16 acquires the cluster ID of a symbol type corresponding to the symbol ID of the link symbol 353 by referring to the symbol data 26 in the storage unit 20. In this case, since the symbol type is a link, the display processing unit 16 refers to the large classification data 25 to acquire logical product "center/award, management/department, equipment/sales" between the logical sum of the labels of all clusters integrated in clusters directly connected to the lower level side of the link symbol 353, of the clusters connected to the link symbol 353, and the labels of clusters directly connected to the upper level side of the link symbol 353, and display the logical product as a label 356 at a position near the link symbol 353 on the screen.

In this embodiment, in this manner, the display processing unit 16 displays a label indicating the contents of a selected symbol on the screen display unit 40 in accordance with selecting operation with respect to an arbitrary cluster symbol or link symbol as a component of a tree structure displayed as a large classification result on the screen. This makes it possible to easily check classification contents associated with a desired cluster. In addition, if a plurality of clusters are simultaneously selected, a set obtained by performing arbitrary local operation with respect to the labels of the respective clusters is displayed. This makes it possible to grasp a relationship associated with a plurality of clusters in more detail.

Third Embodiment

Figure 21:
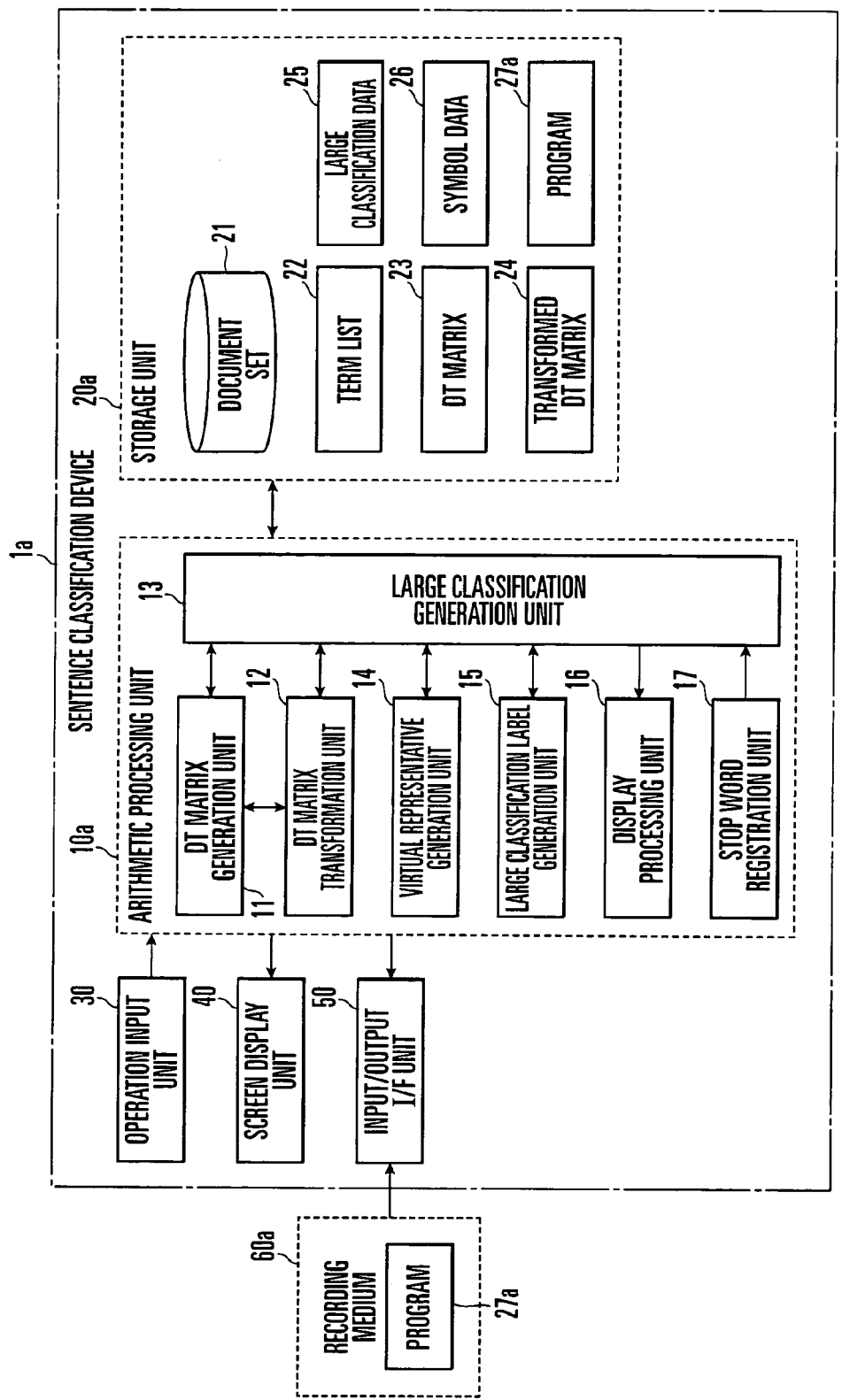
FIG. 21 is a block diagram showing the arrangement of a sentence classification device according to the third embodiment of the present invention.

A sentence classification device according to the third embodiment of the present invention will be described next with reference to FIG. 21. FIG. 21 shows the arrangement of the sentence classification device according to the third embodiment of the present invention.

The first embodiment has exemplified the case wherein the respective clusters obtained by large classification generation processing are displayed in the form of a tree structure on the screen. The third embodiment will exemplify a case wherein one of labels associated with an arbitrary cluster of this tree structure is registered as a term which is not used in large classification processing, i.e., a stop word, and large classification processing is executed again upon removal of this stop word. The same reference numerals as in FIG. 1 denote the same components in FIG. 21, and a description thereof will be properly omitted.

An arithmetic processing unit 10a of a sentence classification device 1a according to this embodiment is provided with a stop word registration unit 17, in addition to the functional units of the arithmetic processing unit 10 in the first embodiment.

The stop word registration unit 17 has a function of acquiring labels associated with clusters corresponding to selected symbols in accordance with selecting operation with respect to cluster symbols or link symbols detected by an operation input unit 30, and displaying the labels as a selected keyword list on a screen display unit 40, a function of registering a selected keyword as a stop word in accordance with selecting operation with respect to an arbitrary keyword in the selected keyword list detected by the operation input unit 30, and a function of removing the registered stop word from a term list 22 and designating re-classification using a large classification generation unit 13.

Referring to FIG. 21, a program 27a is a program which causes the arithmetic processing unit 10a to implement each functional unit including the stop word registration unit 17, and a recording medium 60a is a recording medium on which the program 27a is recorded.

The arithmetic processing unit 10*a* of the sentence classification device 1*a* causes the stop word registration unit 17 to start stop word registering operation in accordance with stop word registering operation with the operation input unit 30. For example, while a large classification generation result is displayed in a display output area on the screen display unit 40, the arithmetic processing unit 10*a* may cause a display processing unit 16 to display an operation menu 360 in FIG. 20 on the screen in accordance with selecting operation with respect to an arbitrary cluster symbol or link symbol as a component of the tree structure, and may start stop word registering operation in accordance with a stop word registration instruction from the operation menu 360.

Figure 22:
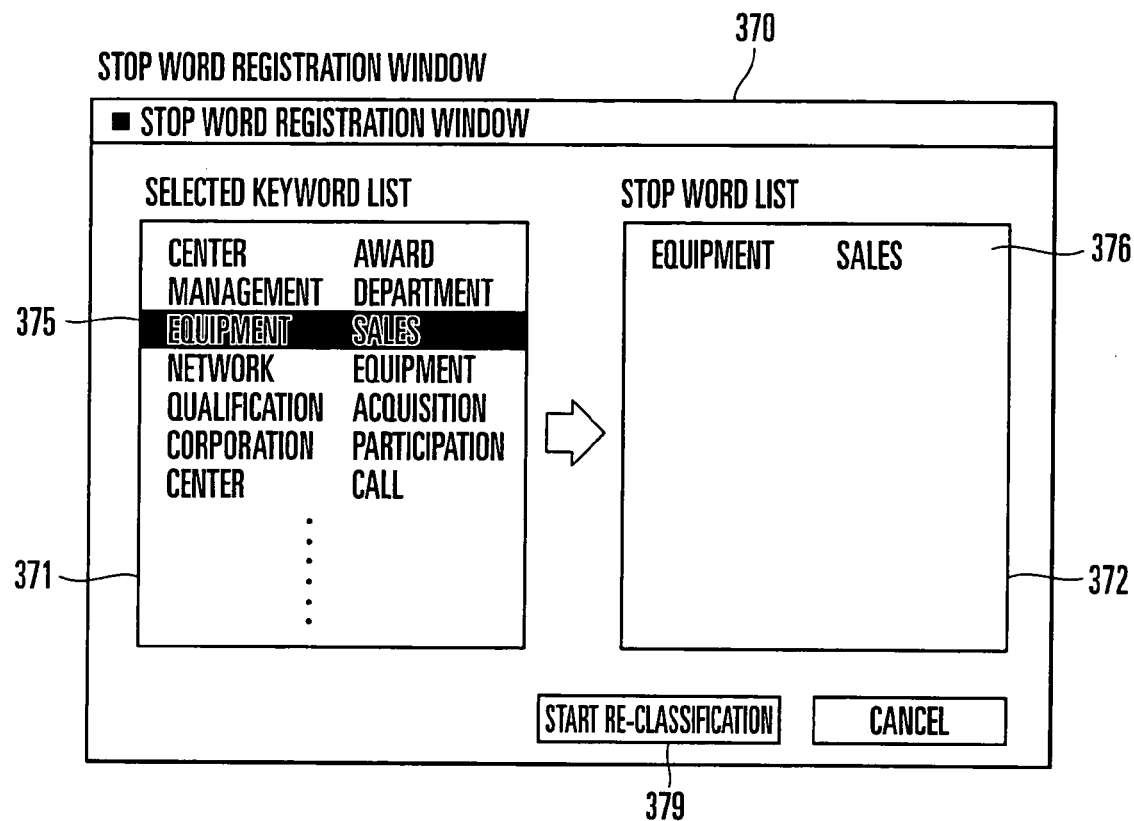
FIG. 22 is a view showing an example of a registration window output used in stop word registering operation.

In stop word registering operation, first of all, the stop word registration unit 17 displays a stop word registration window 370 in FIG. 22 on the screen. The stop word registration window 370 displays a selected keyword list 371 of stop word candidates and a stop word list 372 of selected stop words. If, for example, a label 375 of "equipment/sales" in the selected keyword list 371 is selected with the mouse, the selected label is displayed and registered as a new stop word 376 in the stop word list 372.

In this case, as labels to be displayed in the selected keyword list 371, the labels of clusters corresponding to symbols selected immediately before displaying of the stop word registration window 370 may be acquired from the large classification data 25 and displayed, or the logical sum set of the labels of all the clusters integrated in selected clusters or of the clusters displayed on the screen may be displayed. Alternatively, the virtual representative documents of selected clusters or the terms contained in all the documents integrated in selected clusters may be displayed in the selected keyword list 371 without using any labels of clusters.

If a "re-classification start" button 379 is pressed in the stop word registration window 370 after the completion of stop word registration, the stop word registration unit 17 instructs a large classification generation unit 13 to perform large classification generation processing upon removal of each stop word described above from the term list 22 in a storage unit 20*a*. In this case, it suffices if the stop words are stored in the storage unit 20*a* to allow the large classification generation unit 13 to refer to the stop words in large classification generation processing, and the stop word registration unit 17 writes "valid/invalid" in each stop word field provided in the term list 22 to allow the large classification generation unit 13 to refer to each stop word field in large classification generation processing.

Figure 23:
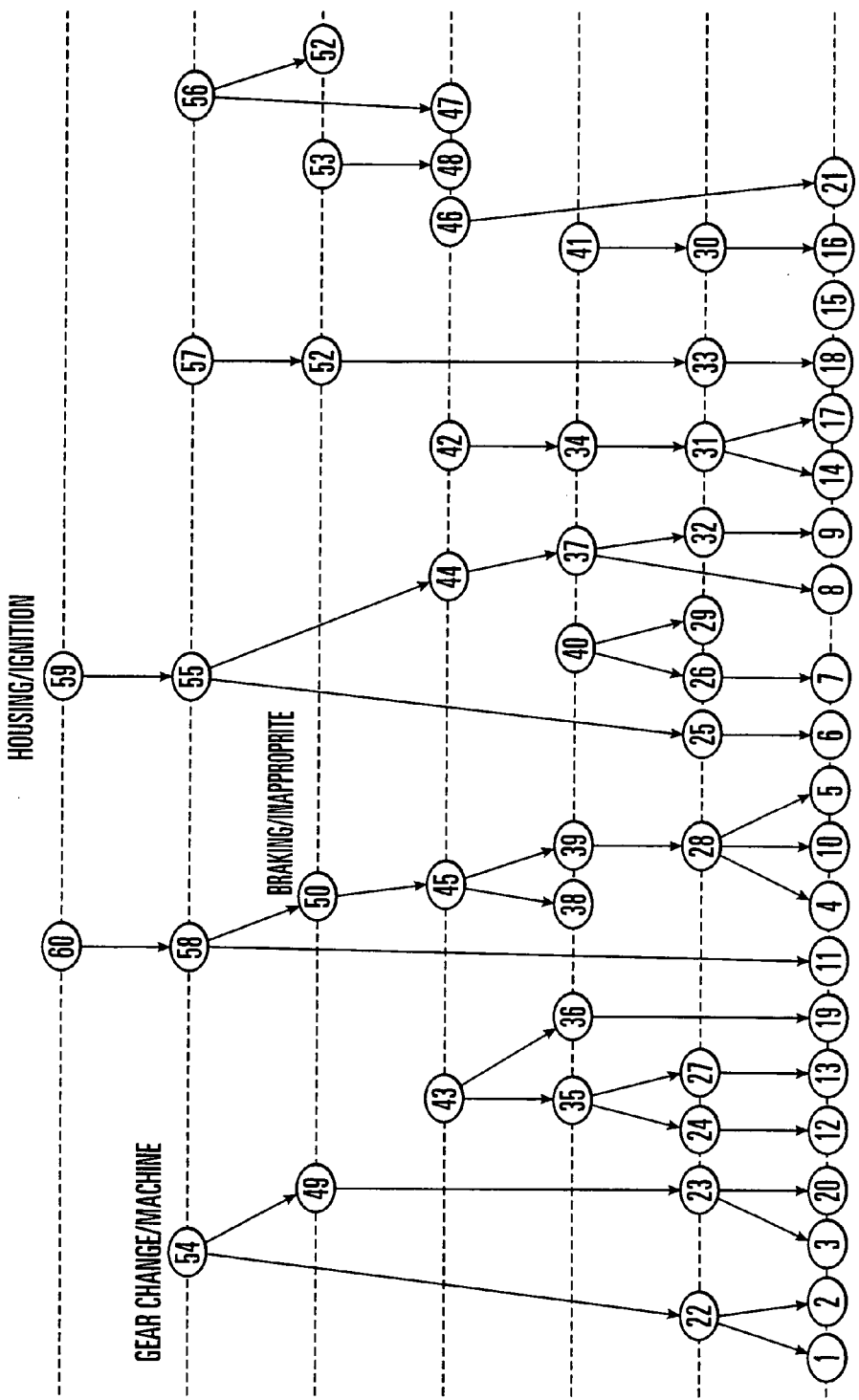
FIG. 23 is a view showing an example of a display window displaying a large classification result when no stop word is registered.
Figure 24:
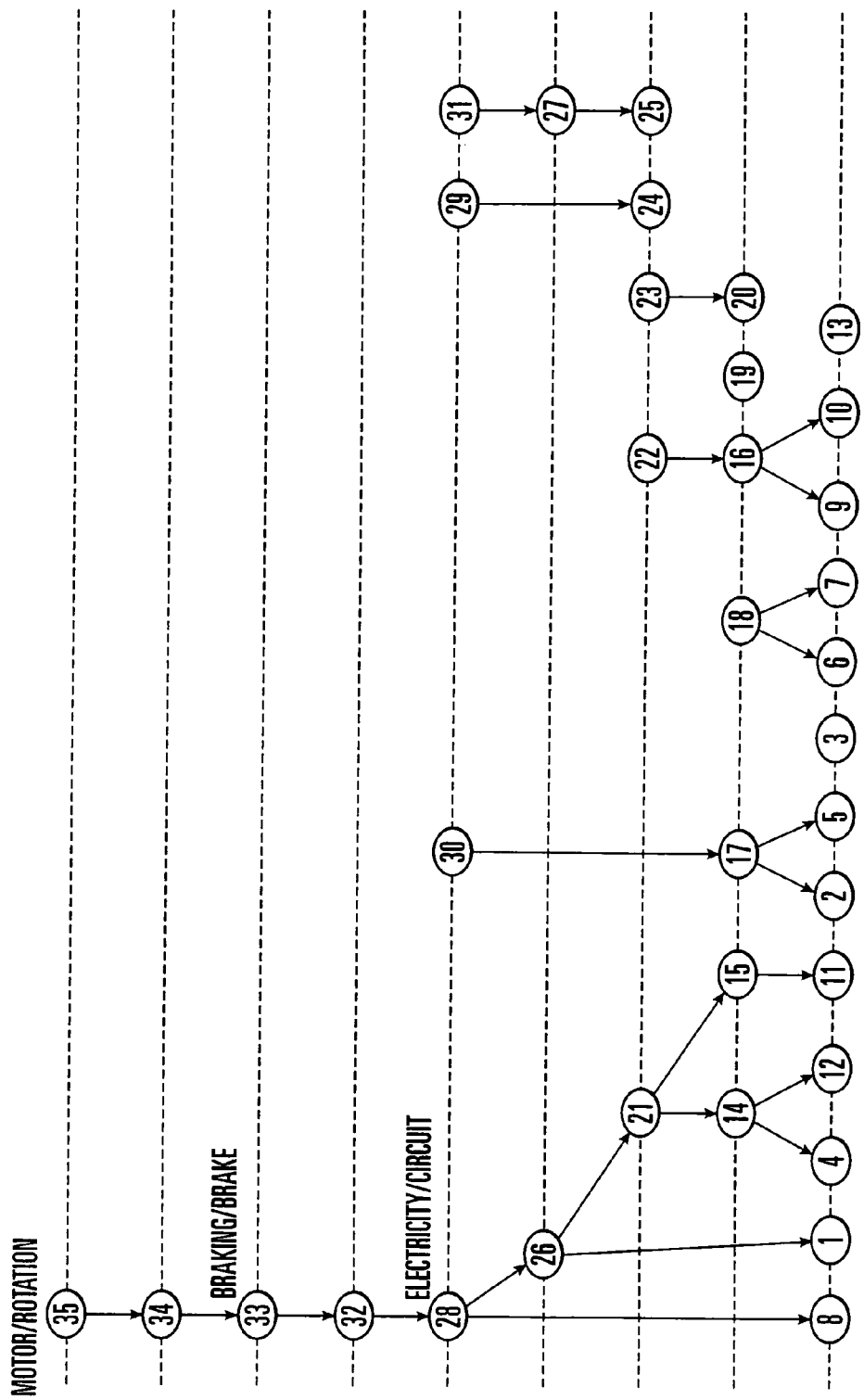
FIG. 24 is a view showing an example of a display window displaying a large classification result when stop words are registered.

This allows the large classification generation unit 13 to execute large classification generation processing upon removal of each stop word described above. FIG. 23 shows an example of a display window showing a large classification result without registration of any stop words. FIG. 24 shows an example of a display window showing a large classification result when stop words are registered. Obviously, the tree structure is greatly simplified by generating large classifications again upon registering stop words.

In this embodiment, in this manner, any of labels associated with arbitrary clusters of a tree structure obtained by large classification are registered as terms which are not used in large classification processing, i.e., stop words, and large classification processing is executed again upon removal of the stop words. This makes it possible to remove unnecessary terms and obtain large classifications with less noise with respect to the document set 21.

Fourth Embodiment

A sentence classification device according to the fourth embodiment of the present invention will be described next.

The first embodiment has exemplified the case wherein the respective clusters obtained by large classification generation processing are displayed in the form of a tree structure on the screen. This embodiment will exemplify a case wherein properties associated with the graph structure of a tree structure obtained by large classification processing are displayed as property information on the screen. Although a function to be described below is added to a display processing unit 16 in the sentence classification device according to this embodiment, the overall arrangement of the device is the same as that of the first embodiment described above. A detailed description of this arrangement will be omitted.

When displaying a large classification generation result in a display output area on a screen display unit 40, an arithmetic processing unit 10 of a sentence classification device 1 displays properties associated with the graph structure of the tree structure as property information on the screen. As proper information, at least one of the following is used: the vertex degree average obtained from the average of the numbers of branches (the numbers of links) branching from the respective clusters and the branch count average obtained from the average of the numbers of branches (the numbers of links) used in the overall tree structure.

In general, when the hierarchical arrangement of an arbitrary target is to be expressed by a tree structure, the hierarchical structure can be easily grasped as the graph structure is reduced to a certain extent. A vertex degree average or branch count average is a measure indicating the size or complexity of a tree structure. Displaying such property information in a numerical value on the screen makes it possible to easily determine on the basis of such property information whether it is necessary to repeat, for example, large classification generation processing using stop words.

As described above, according to the present invention, a virtual representative document is generated for each cluster on a transformed DT matrix generated from a DT matrix in clustering processing, a new DT matrix used in next clustering processing is generated by adding the virtual representative documents to the transformed DT matrix and deleting documents belonging to the clusters corresponding to the virtual representative documents from the transformed DT matrix, and at least information associated with documents constituting each cluster is output as large classification data for each cluster. The large classification result is displayed in the form of a tree structure using cluster symbols indicating the respective clusters and link symbols indicating the integral relations between the respective clusters on the screen on the basis of the large classification data.

This makes it possible to automatically obtain clusters not only as classifications including only original documents as elements but also as larger classifications each including one or more clusters, i.e., larger classifications, from a document set. By repeating such clustering processing, hierarchical clustering is realized from each document in a bottom-up manner.

In addition, the hierarchical relationship between the respective clusters, i.e., the large classifications, can be displayed on the screen as a tree structure by using cluster symbols and link symbols. The importance of each document and the relationship between the documents can be automatically visualized.

What is claimed is:

1. A sentence classification device comprising:
a storage unit which stores various kinds of processing information including a document set of a plurality of documents and a term list including a plurality of terms each having not less than one word;
an arithmetic processing unit which classifies the respective documents stored in said storage unit on the basis of the term list;
and a screen display unit which displays a processing result obtained by said arithmetic processing unit on a screen,
said arithmetic processing unit comprising a DT matrix generation unit which generates a DT matrix in which a relationship between each document stored in said storage unit and each term is two-dimensionally expressed,
a DT matrix transformation unit which generates a transformed DT matrix in which documents are divided into blocks for each cluster by transforming the DT matrix on the basis of a DM decomposition method used in a graph theory,
a virtual representative generation unit which generates a virtual representative document which virtually represents each cluster on the transformed DT matrix from terms of documents belonging to each cluster,
a large classification generation unit which generates large classifications of documents by repeating clustering processing as a step by using the DT matrix generated by said DT matrix generation unit in an initial state,
the clustering processing comprising a process of causing said DT matrix transformation unit to generate a transformed DT matrix from the DT matrix,
a process of causing said virtual representative generation unit to generate a virtual representative document for each cluster on the generated transformed DT matrix,
a process of generating a new DT matrix used in next clustering processing by adding the generated virtual representative documents to the transformed DT matrix and deleting documents belonging to the clusters corresponding to the virtual representative documents from the transformed DT matrix, and
a process of storing at least information associated with documents constituting each cluster as large classification data in said storage unit for each cluster, and
a display processing unit which causes said screen display unit to display, on a screen, large classifications of documents in a tree structure using cluster symbols representing clusters generated in clustering processing and link symbols indicating integral relations between the clusters on the basis of the large classification data stored in said storage unit.

2. The device according to claim 1, wherein said display processing unit displays, on a screen, identification information unique to a cluster represented by a cluster symbol and a label indicating a content of the cluster at least one of on and near the cluster symbol.

3. The device according to claim 1, further comprising a large classification label generation unit which generates, when a virtual representative document is contained in a cluster obtained by said large classification generation unit in clustering processing, a label indicating a content of an original cluster of the virtual representative document from a term strongly connected to the virtual representative document.

4. The device according to claim 1, wherein said display processing unit hierarchically displays cluster symbols of clusters obtained by clustering processing in order of steps in clustering processing repeatedly performed by said large classification generation unit.

5. The device according to claim 1, wherein said display processing unit displays, on a screen, a label indicating a content of one of a cluster corresponding to a selected cluster symbol and a cluster connected by a link symbol in accordance with selecting operation with respect to one of a cluster symbol and a link symbol displayed on the screen.

6. The device according to claim 1, further comprising a stop word registration unit which registers a term, of terms contained in the term list, which is not used as a stop word, wherein said large classification generation unit generates large classifications of documents again by using a DT matrix in an initial state which is generated by said DT matrix generation unit using other terms excluding a registered stop word.

7. The device according to claim 1, wherein when displaying large classifications of documents in a tree structure on a screen, said display processing unit displays, on the screen, proper information indicating at least one of a size and complexity of the tree structure.

8. A sentence classification method comprising the steps of:
generating a DT matrix in which a relationship between each document and each term is two-dimensionally expressed by referring to a storage unit which stores various kinds of processing information including a document set of a plurality of documents and a term list including a plurality of terms each having not less than one word;
generating a transformed DT matrix in which documents are divided into blocks for each cluster by transforming the DT matrix on the basis of a DM decomposition method used in a graph theory, generating a virtual representative document which virtually represents each cluster on the generated transformed DT matrix from terms of documents belonging to each cluster;
generating a new DT matrix by adding the generated virtual representative documents to the transformed DT matrix and deleting documents belonging to the clusters corresponding to the virtual representative documents from the transformed DT matrix;
storing at least information associated with documents constituting each cluster as large classification data in the storage unit for each cluster;
generating large classifications of documents by repeatedly performing clustering processing comprising the steps of generating a transformed DT matrix by using a new DT matrix, further generating a new DT matrix by generating virtual representative documents, and storing information; and
displaying, on a screen, large classifications of documents in a tree structure using cluster symbols representing clusters generated in clustering processing and link symbols indicating integral relations between the clusters on the basis of the large classification data stored in the storage unit.

9. A recording medium on which a program is recorded, the program causing a computer to execute the steps of:
generating a DT matrix in which a relationship between each document and each term is two-dimensionally expressed by referring to a storage unit which stores various kinds of processing information including a document set of a plurality of documents and a term list including a plurality of terms each having not less than one word;

generating a transformed DT matrix in which documents are divided into blocks for each cluster by transforming the DT matrix on the basis of a DM decomposition method used in a graph theory, generating a virtual representative document which virtually represents each cluster on the generated transformed DT matrix from terms of documents belonging to each cluster;

generating a new DT matrix by adding the generated virtual representative documents to the transformed DT matrix and deleting documents belonging to the clusters corresponding to the virtual representative documents from the transformed DT matrix;

storing at least information associated with documents constituting each cluster as large classification data in the storage unit for each cluster;

generating large classifications of documents by repeatedly performing clustering processing comprising the steps of generating a transformed DT matrix by using a new DT matrix, further generating a new DT matrix by generating virtual representative documents, and storing information;

and displaying, on a screen, large classifications of documents in a tree structure using cluster symbols representing clusters generated in clustering processing and link symbols indicating integral relations between the clusters on the basis of the large classification data stored in the storage unit.

* * * * *